United States Patent
Fujio et al.

(10) Patent No.: US 9,793,976 B2
(45) Date of Patent: Oct. 17, 2017

(54) TRANSMISSION POWER MANAGEMENT DEVICE AND TRANSMISSION POWER MANAGEMENT METHOD

(71) Applicant: FUJITSU LIMITED, Kawasaki-shi, Kanagawa (JP)

(72) Inventors: Shunsuke Fujio, Kawasaki (JP); Dai Kimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 94 days.

(21) Appl. No.: 14/220,861

(22) Filed: Mar. 20, 2014

(65) Prior Publication Data
US 2014/0287678 A1   Sep. 25, 2014

(30) Foreign Application Priority Data

Mar. 22, 2013  (JP) ................ 2013-060993

(51) Int. Cl.
*H04B 7/155* (2006.01)
*H04W 52/24* (2009.01)
*H04B 7/185* (2006.01)
*H04W 52/08* (2009.01)
*H04W 52/50* (2009.01)
*H04W 52/36* (2009.01)

(52) U.S. Cl.
CPC ..... *H04B 7/15535* (2013.01); *H04B 7/18543* (2013.01); *H04W 52/08* (2013.01); *H04W 52/24* (2013.01); *H04W 52/367* (2013.01); *H04W 52/50* (2013.01); *Y02B 60/50* (2013.01)

(58) Field of Classification Search
CPC combination set(s) only.
See application file for complete search history.

(56) References Cited

U.S. PATENT DOCUMENTS

| 8,160,634 B1* | 4/2012 | Vargantwar ....... H04W 52/0212 455/127.1 |
| 2001/0014612 A1* | 8/2001 | Uesugi ................ H04W 52/225 455/522 |
| 2005/0063356 A1* | 3/2005 | Larsen ................... H04L 43/08 370/351 |

(Continued)

FOREIGN PATENT DOCUMENTS

| JP | 2011-082854 A | 4/2011 |
| JP | 2011-146804 A | 7/2011 |

(Continued)

OTHER PUBLICATIONS

Riihonen, et al., "Optimized Gain Control for Single-Frequency Relaying with Loop Interference," IEEE Transactions on Wireless Communications, Jun. 2009, pp. 2801-2806, vol. 8, No. 6.

(Continued)

*Primary Examiner* — Ankur Jain
*Assistant Examiner* — Zhitong Chen
(74) *Attorney, Agent, or Firm* — Arent Fox LLP

(57) ABSTRACT

A transmission power management device including: a memory, and a processor coupled to the memory and configured to: acquire a first path loss between a first relay station and a second relay station, the first relay station relaying a first signal, the second relay station relaying a second signal, and adjust a first transmission power of the first signal by the first relay station based on the first path loss.

21 Claims, 16 Drawing Sheets

(56) References Cited

U.S. PATENT DOCUMENTS

| | | | | |
|---|---|---|---|---|
| 2008/0039129 A1* | 2/2008 | Li | .................. | H04L 1/0003 |
| | | | | 455/522 |
| 2010/0124880 A1* | 5/2010 | Wu | .................. | H04B 7/15535 |
| | | | | 455/7 |
| 2011/0319122 A1* | 12/2011 | Zhou | .................. | H04W 52/146 |
| | | | | 455/522 |
| 2013/0094433 A1* | 4/2013 | Nagata | .................. | H04B 7/15542 |
| | | | | 370/315 |
| 2015/0003300 A1* | 1/2015 | Bandoh | .................. | 370/279 |

FOREIGN PATENT DOCUMENTS

| | | |
|---|---|---|
| JP | 2012-005015 A | 1/2012 |
| JP | 2012-217193 A | 11/2012 |
| JP | 2013-046398 A | 3/2013 |

OTHER PUBLICATIONS

Japanese Office Action of related Japanese Patent Application No. 2013-060993 dated Aug. 2, 2016.

\* cited by examiner

TRANSMISSION POWER MANAGEMENT DEVICE AND TRANSMISSION POWER MANAGEMENT METHOD

CROSS-REFERENCE TO RELATED APPLICATION

This application is based upon and claims the benefit of priority of the prior Japanese Patent Application No. 2013-060993, filed on Mar. 22, 2013, the entire contents of which are incorporated herein by reference.

FIELD

The embodiments discussed herein are related to a transmission power management device and a transmission power management method in a wireless communication system.

BACKGROUND

In a communication area where the reception power of a signal transmitted from a base station becomes weak and a terminal not capable of ensuring sufficient reception power exists, a relay station is used that amplifies the reception power of a signal transmitted from the base station and relay-transmits the signal to a terminal. In the relay station, the power of a signal received from the base station is amplified and the signal after the power amplification is retransmitted to a terminal.

Here, in a full-duplex type relay station performing transmission and reception at a same time and with a same frequency, a phenomenon called a "wraparound" occurs where the transmission signal of the self-station turns out to be received by the self-station. There is a possibility that, owing to the repetition of the wraparound, the power of a signal input to an amplifier included in the relay station exceeds an assumption at the time of the designing of the relay station and the amplifier oscillates. In addition, when the wraparound is repeated, a processing delay or a propagation delay within the relay station is accumulated. Therefore, an interference between symbols (hereinafter, simply referred to as an "intersymbol interference" in some cases) at the time of the reception of a signal in the terminal occurs, and reception quality is deteriorated.

As a technique of the related art for minimizing the deterioration of reception quality due to the wraparound, there is a technique for controlling, on the basis of a path loss between a relay station and a terminal or a path loss between a base station and the relay station, the transmission power of the relay station so that reception quality in the terminal is maximized. For example, there is a technique of the related art for obtaining the transmission power of a relay station, which maximizes reception quality in a terminal, in a case where a processing delay in the relay station is equal to one symbol length of a desired signal and no propagation delay exists.

A technique of the related art is disclosed in Riihonen, T. et. al., "Optimized gain control for single-frequency relaying with loop interference," *Wireless Communications, IEEE Transactions on*, Vol. 8, No. 6, pp. 2801-2806, 2009.

SUMMARY

According to an aspect of the invention, a transmission power management device includes a memory, and a processor coupled to the memory and configured to: acquire a first path loss between a first relay station and a second relay station, the first relay station relaying a first signal, the second relay station relaying a second signal, and adjust a first transmission power of the first signal by the first relay station based on the first path loss.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the above-mentioned technique of the related art, while a wraparound between a transmission antenna and a reception antenna in one relay station is taken into consideration, a wraparound occurring between relay stations (hereinafter, referred to as a "inter-relay-station wraparound" in some cases) is not taken into consideration, the wraparound occurring owing to a plurality of relay stations repeating relay-transmission. Therefore, in the above-mentioned technique of the related art, in particular, in a case where relay stations are densely placed, an intersymbol interference becomes large, and there is a possibility that reception quality in a terminal is deteriorated. For example, in a case where another relay station #2 exists around a relay station #1, a signal transmitted from a transmission antenna of the relay station #1 is received by a reception antenna of the relay station #2, and transmitted from a transmission antenna of the relay station #2 again. Furthermore, the signal transmitted from the transmission antenna of the relay station #2 is received by a reception antenna of the relay station #1, and transmitted from the transmission antenna of the relay station #1 again. In this way, when a phenomenon has occurred where relay-transmission is repeated between the relay station #1 and the relay station #2, an increase in transmission power in the relay station #1 leads to an increase in the amount of an interference to a terminal currently coupled to the relay station #2, and may cause reception quality deterioration in that terminal.

In view of the above, the disclosed technology is made, and it is an object thereof to provide a transmission power management device and a transmission power management method that are capable of avoiding the deterioration of reception quality in a terminal even in a case where a plurality of relay stations are densely placed.

Hereinafter, embodiments of a transmission power management device and a transmission power management method, disclosed in the present application, will be described in detail on the basis of drawings. In addition, the transmission power management device and the transmission power management method, disclosed in the present application, are not limited owing to the embodiments. In addition, in the individual embodiments, same symbols will be assigned to configurations having same functions and steps performing same processing operations, and the redundant descriptions thereof will be omitted.

[First Embodiment]
<Example of Configuration of Transmission Power Management Device>

Figure 1:
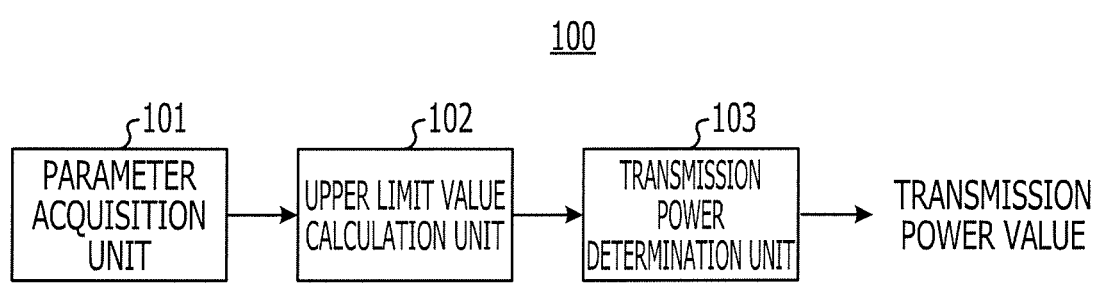
FIG. 1 is a functional block diagram illustrating an example of a transmission power management device of a first embodiment.

FIG. 1 is a functional block diagram illustrating an example of a transmission power management device of the first embodiment. A transmission power management device 100 illustrated in FIG. 1 determines the transmission power value of a signal to be relay-transmitted from a relay station. In addition, the transmission power management device 100 is included in a base station or a relay station. In FIG. 1, the transmission power management device 100 includes a parameter acquisition unit 101, an upper limit value calculation unit 102, and a transmission power management unit 103.

The parameter acquisition unit 101 acquires various kinds of parameters used for calculating the upper limit value of transmission power, and outputs the acquired parameters to the upper limit value calculation unit 102. The parameter acquisition unit 101 acquires at least a path loss between relay stations, as the parameter. The details of the parameters will be described later.

On the basis of the parameters acquired in the parameter acquisition unit 101, the upper limit value calculation unit 102 calculates the upper limit value of the transmission power of a relay station, and outputs the calculated upper limit value to the transmission power management unit 103. On the basis of at least a path loss between relay stations, the upper limit value calculation unit 102 calculates the upper limit value of the transmission power of the relay station. The detail of the calculation of the upper limit value will be described later.

The transmission power management unit 103 determines the transmission power of the relay station to be an electric power value less than or equal to the upper limit value calculated in the upper limit value calculation unit 102, and outputs the determined transmission power value. The detail of the determination of the transmission power value will be described later.

In this way, on the basis of a path loss between relay stations, the transmission power management device 100 calculates the upper limit value of the transmission power of the relay station, and hence, as described in the following embodiment, it is possible to avoid the deterioration of reception quality in a terminal even in a case where a plurality of relay stations are densely placed.

Hereinafter, in second to fifth embodiments, a case will be described where a base station includes the transmission power management device 100, and in a sixth embodiment, a case will be described where a relay station includes the transmission power management device 100.

[Second Embodiment]
<Example of Configuration of Communication System>

Figure 2:
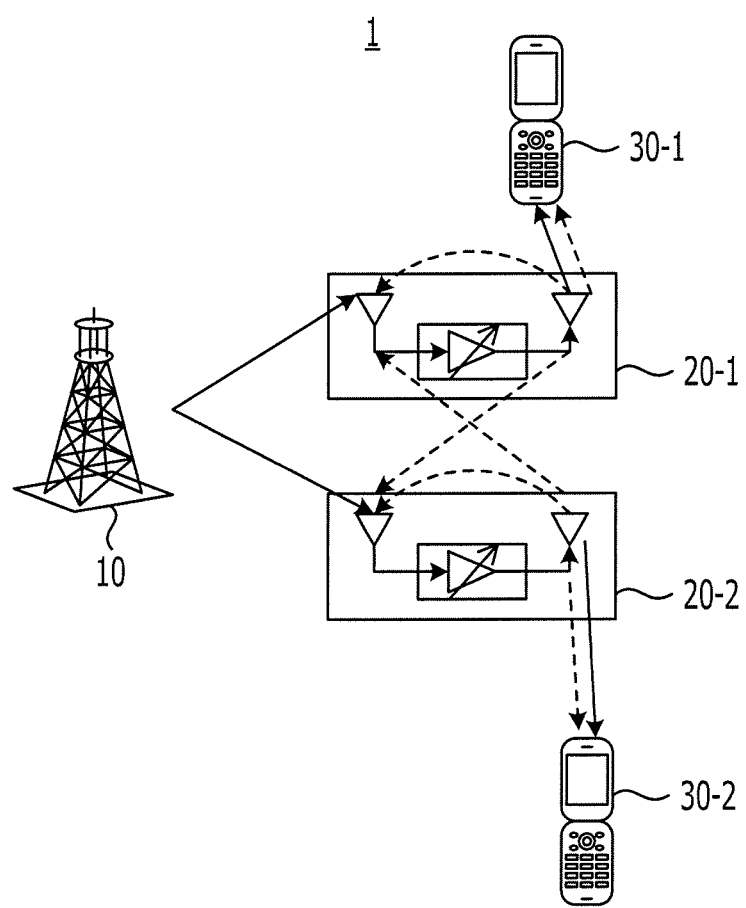
FIG. 2 is a diagram illustrating an example of a configuration of a communication system of a second embodiment.

FIG. 2 is a diagram illustrating an example of the configuration of a communication system of the second embodiment. In FIG. 2, a communication system 1 includes a base station 10, relay stations 20-1 and 20-2, a terminal 30-1 currently coupled to the relay station 20-1, and a terminal 30-2 currently coupled to the relay station 20-2. In addition, in what follows, in a case of not being specifically distinguished, a plurality of relay stations are simply referred to as "relay stations 20" in some cases. In addition, in a case of not being specifically distinguished, a plurality of terminals are simply referred to as "terminals 30" in some cases.

In FIG. 2, signals indicated by solid lines are desired signals, and signals indicated by dotted lines are interference signals due to wraparounds. In other words, a desired signal transmitted from the base station 10 to the relay station 20-1 is relay-transmitted in the relay station 20-1, and reaches the terminal 30-1. On the other hand, a desired signal to the terminal 30-1 becomes an interference signal due to a wraparound between the transmitting end and the receiving end of the relay station 20-1 and an interference signal due to a wraparound from the transmitting end of the relay station 20-1 to the receiving end of the relay station 20-2. In the same way, a desired signal transmitted from the base station 10 to the relay station 20-2 is relay-transmitted in the relay station 20-2, and reaches the terminal 30-2. On the other hand, a desired signal to the terminal 30-2 becomes an interference signal due to a wraparound between the transmitting end and the receiving end of the relay station 20-2 and an interference signal due to a wraparound from the transmitting end of the relay station 20-2 to the receiving end of the relay station 20-1.

Under such a situation as illustrated in FIG. 2, on the basis of a path loss between relay stations, the transmission power management device 100 calculates the upper limit value of the transmission power of a relay station.

<Example of Configuration of Base Station>

Figure 3:
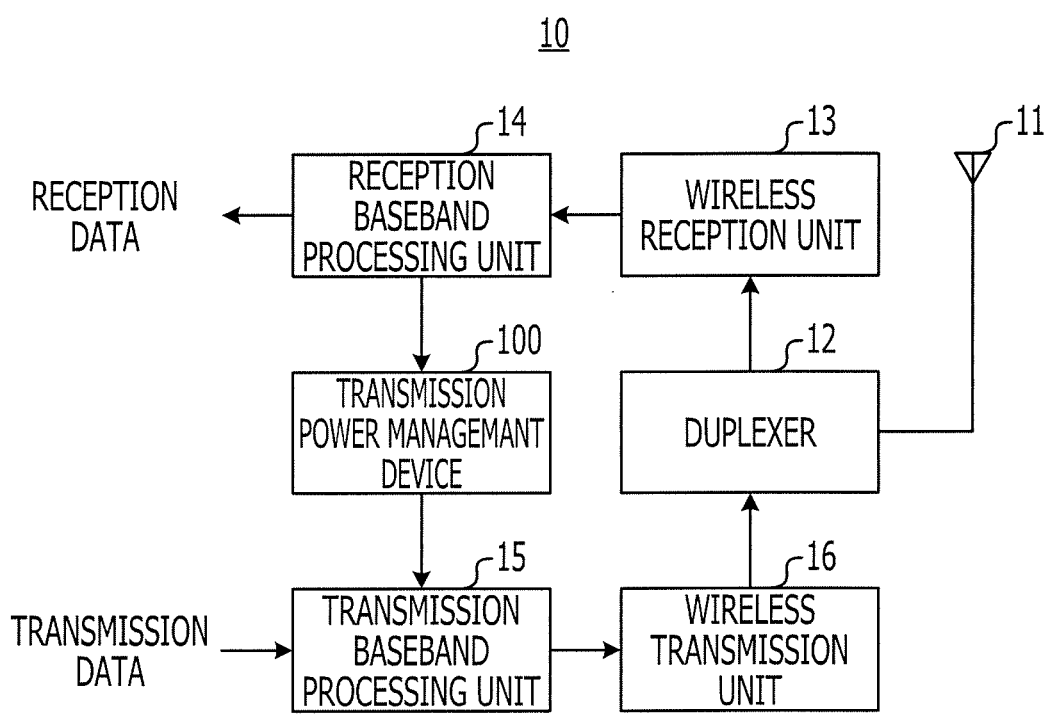
FIG. 3 is a functional block diagram illustrating an example of a base station of the second embodiment.

FIG. 3 is a functional block diagram illustrating an example of the base station of the second embodiment. In FIG. 2, the base station 10 includes an antenna 11, a duplexer 12, a wireless reception unit 13, a reception baseband processing unit 14, the transmission power management device 100, a transmission baseband processing unit 15, and a wireless transmission unit 16.

The wireless reception unit 13 receives a wireless signal through the antenna 11 and the duplexer 12, performs, on the wireless signal, wireless reception processing, in other words, down-conversion, analog-to-digital conversion, and so forth to obtain and output a baseband signal to the reception baseband processing unit 14.

The reception baseband processing unit 14 performs, on the baseband signal, reception baseband processing, in other words, demodulation and so forth to obtain and output reception data to the transmission power management device 100.

The transmission power management device 100 acquires a parameter included in the reception data, and calculates the upper limit value of the transmission power of the relay station 20 on the basis of the acquired parameter. In addition, the transmission power management device 100 determines the transmission power of the relay station 20 to be an electric power value less than or equal to the calculated upper limit value. In addition, the transmission power management device 100 outputs, to the transmission baseband processing unit 15, data indicating the determined transmission power value (hereinafter, referred to as "relay station transmission power value data" in some cases).

The transmission baseband processing unit 15 performs, on the relay station transmission power value data and transmission data, transmission baseband processing, in other words, modulation and so forth to obtain and output a baseband signal to the wireless transmission unit 16.

The wireless transmission unit 16 performs, on the baseband signal, wireless transmission processing, in other words, digital-to-analog conversion, up-conversion, and so forth to obtain a wireless signal, and transmits the wireless signal through the duplexer 12 and the antenna 11.

<Example of Configuration of Relay Station>

Figure 4:
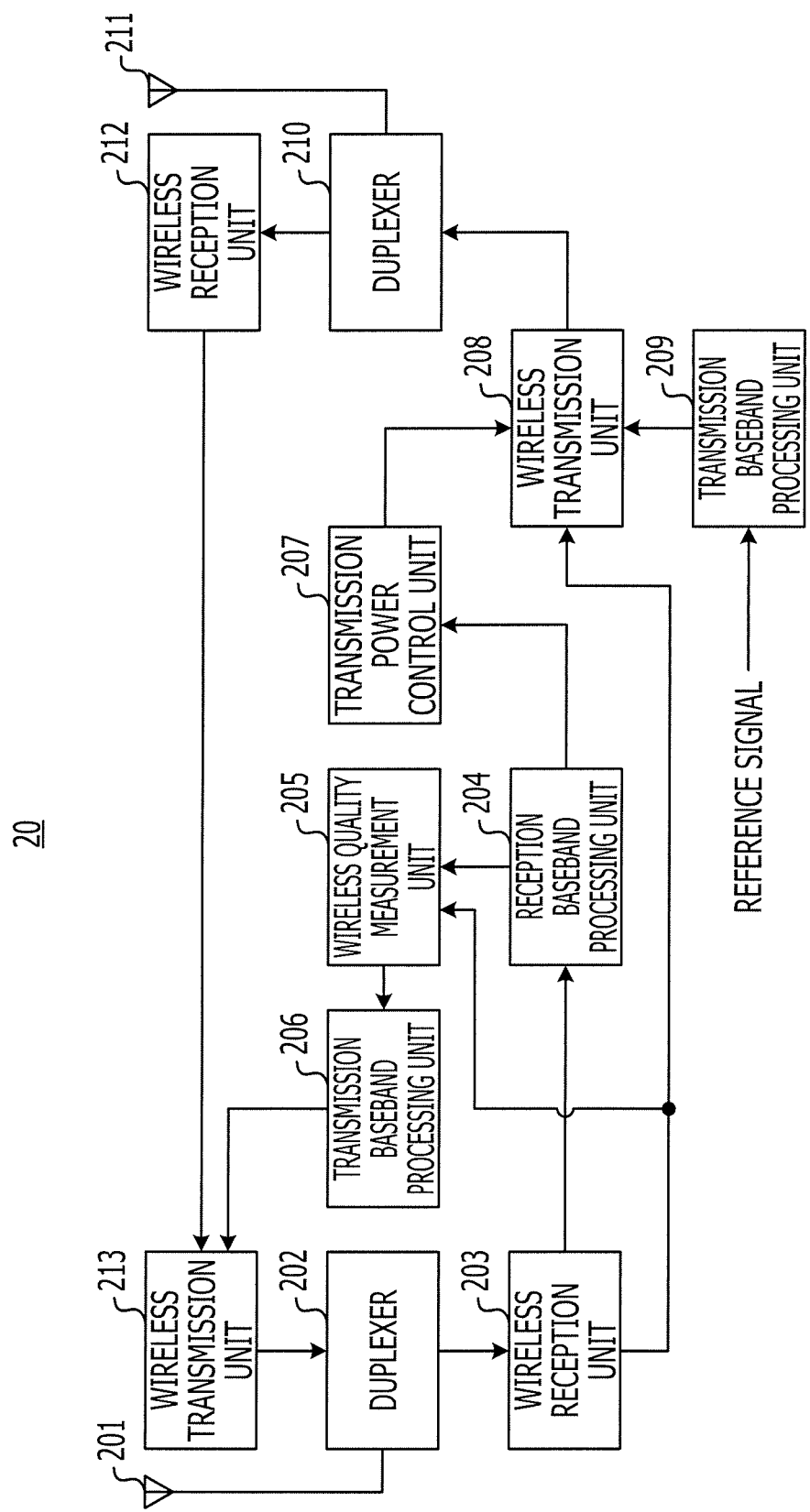
FIG. 4 is a functional block diagram illustrating an example of a relay station of the second embodiment.

FIG. 4 is a functional block diagram illustrating an example of the relay station of the second embodiment. In FIG. 4, the relay station 20 includes antennas 201 and 211, duplexers 202 and 210, wireless reception units 203 and 212, a reception baseband processing unit 204, transmission baseband processing units 206 and 209, and wireless transmission units 208 and 213. In addition, the relay station 20 includes a wireless quality measurement unit 205 and a transmission power control unit 207.

The wireless reception unit 203 receives a wireless signal from the base station 10 or another relay station 20 through the antenna 201 and the duplexer 202, and performs, on the wireless signal, wireless reception processing, in other words, down-conversion, analog-to-digital conversion, and so forth to obtain a baseband signal. The wireless reception unit 203 outputs, to the reception baseband processing unit 204, a baseband signal including the relay station transmission power value data transmitted from the base station 10 and a baseband signal including a reference signal transmitted from the other relay station 20. In addition, the wireless reception unit 203 outputs, to the wireless quality measurement unit 205 and the wireless transmission unit 208, a baseband signal including a data signal transmitted from the base station 10.

The reception baseband processing unit 204 performs, on the baseband signal, reception baseband processing, in other words, demodulation and so forth to obtain reception data. This reception data includes the relay station transmission power value data transmitted from the base station 10 or the reference signal transmitted from the other relay station 20 with already-known transmission power. The reception baseband processing unit 204 outputs the relay station transmission power value data to the transmission power control unit 207, and outputs, to the wireless quality measurement unit 205, a reference signal after the reception baseband processing.

In accordance with an electric power value indicated by the relay station transmission power value data, the transmission power control unit 207 controls the amplification factor of an amplifier included in the wireless transmission unit 20. In other words, by controlling the amplification factor of an amplifier, the transmission power control unit 207 controls the transmission power of a wireless signal to be relay-transmitted to the terminal 30 by the wireless transmission unit 208 so that the transmission power of a wireless signal becomes the electric power indicated by the relay station transmission power value data.

The transmission baseband processing unit 209 performs, on the reference signal, transmission baseband processing, in other words, modulation and so forth to obtain and output a baseband signal to the wireless transmission unit 208.

The wireless transmission unit 208 performs, on the baseband signal, wireless transmission processing, in other words, digital-to-analog conversion, up-conversion, and so forth to obtain a wireless signal, and transmits the wireless signal through the duplexer 210 and the antenna 211. In other words, the wireless transmission unit 208 relay-transmits, to the terminal 30, the baseband signal including the data signal from the base station 10 with transmission power according to the relay station transmission power value data. In addition, the wireless transmission unit 208 transmits the reference signal after the transmission baseband processing with given and already-known transmission power.

The wireless quality measurement unit 205 measures the reception power of the baseband signal input from the wireless reception unit 203, in other words, the data signal. In addition, using a signal input from the reception baseband processing unit 204, in other words, the reference signal, the wireless quality measurement unit 205 measures a path loss between the self-station and another relay station 20. For example, the wireless quality measurement unit 205 obtains, as the path loss, a difference between the already-known transmission power of the reference signal and the reception power of the reference signal. The wireless quality measurement unit 205 outputs a measurement result to the transmission baseband processing unit 206.

The transmission baseband processing unit 206 performs, on the measurement result input from the wireless quality measurement unit 205, transmission baseband processing, in other words, modulation and so forth to obtain and output a baseband signal to the wireless transmission unit 213.

The wireless reception unit 212 receives a wireless signal from the terminal 30 through the antenna 211 and the duplexer 210, and performs, on the wireless signal, wireless reception processing, in other words, down-conversion, analog-to-digital conversion, and so forth to obtain a baseband signal. The wireless reception unit 212 outputs, to the wireless transmission unit 213, the baseband signal including a data signal transmitted from the terminal 30.

The wireless transmission unit 213 performs, on the baseband signal, wireless transmission processing, in other words, digital-to-analog conversion, up-conversion, and so forth to obtain a wireless signal, and transmits the wireless signal to the base station 10 through the duplexer 202 and the antenna 201.

<Example of Configuration of Terminal>

Figure 5:
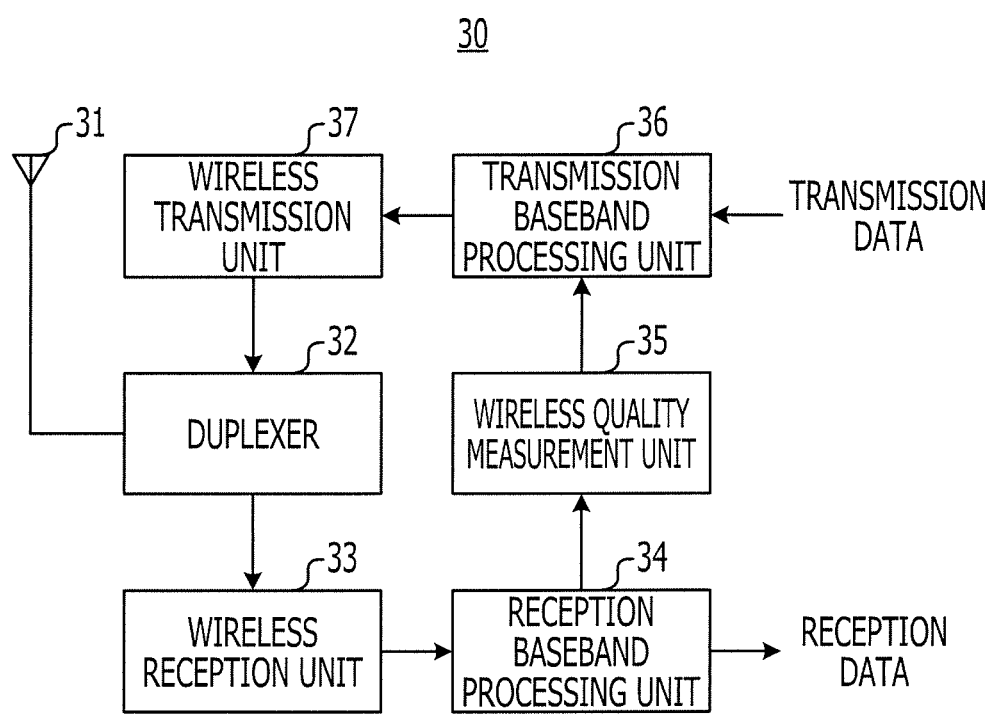
FIG. 5 is a functional block diagram illustrating an example of a terminal of the second embodiment.

FIG. 5 is a functional block diagram illustrating an example of the terminal of the second embodiment. In FIG. 5, the terminal 30 includes an antenna 31, a duplexer 32, a wireless reception unit 33, a reception baseband processing unit 34, a wireless quality measurement unit 35, a transmission baseband processing unit 36, and a wireless transmission unit 37.

The wireless reception unit 33 receives a wireless signal through the antenna 31 and the duplexer 32, performs, on the wireless signal, wireless reception processing, in other words, down-conversion, analog-to-digital conversion, and so forth to obtain and output a baseband signal to the reception baseband processing unit 34. This baseband signal includes the data signal relay-transmitted from the relay station 20 with the transmission power according to the relay station transmission power value data or the reference signal transmitted from the relay station 20 with the already-known transmission power.

The reception baseband processing unit 34 performs, on the baseband signal, reception baseband processing, in other words, demodulation and so forth to obtain reception data. In addition, the reception baseband processing unit 34 outputs, to the wireless quality measurement unit 35, the reference signal after the reception baseband processing.

Using the reference signal after the reception baseband processing, the wireless quality measurement unit 35 measures a path loss between the self-station and the relay station 20. For example, the wireless quality measurement unit 35 obtains, as the path loss, a difference between the already-known transmission power of the reference signal and the reception power of the reference signal. The wireless quality measurement unit 35 outputs a measurement result to the transmission baseband processing unit 36.

The transmission baseband processing unit 36 performs, on the measurement result of the path loss and transmission data, transmission baseband processing, in other words, modulation and so forth to obtain and output a baseband signal to the wireless transmission unit 37.

The wireless transmission unit 37 performs, on the baseband signal, wireless transmission processing, in other words, digital-to-analog conversion, up-conversion, and so forth to obtain a wireless signal, and transmits the wireless signal through the duplexer 32 and the antenna 31.

<Example of Calculation of Upper Limit Value of Transmission Power>

Hereinafter, in FIG. 2, a case will be assumed where a signal relay-transmitted from the relay station 20-1 is received by the relay station 20-2, and received by the terminal 30-2 after being relay-transmitted by the relay station 20-2 again. In this case, if the upper limit value of the transmission power of the relay station 20-1 is calculated in the following way, it is possible to make the power of a reception signal in the terminal 30-2 less than or equal to a threshold value.

In other words, if it is assumed that the relay station 20-1 performs relay-transmission with transmission power $P_1$, the power $Y_2$ of a signal received by the terminal 30-2 is expressed by Expression (1), in the above-mentioned case in FIG. 2.

$$Y_2 = \frac{P_1}{PL_{R1R2}} \cdot G_2 \cdot \frac{1}{PL_{R2D2}} \quad \text{Expression (1)}$$

In Expression (1), the $P_1$ is the transmission power of the relay station 20-1, the $PL_{R1R2}$ is a path loss between the relay station 20-1 and the relay station 20-2, and the $PL_{R2D2}$ is a path loss between the relay station 20-2 and the terminal 30-2. In addition, the $G_2$ is the gain of the relay station 20-2 with respect to a reception signal including an interference signal due to a wraparound from the relay station 20-1.

Therefore, in order to limit reception power in the terminal 30-2 to a threshold value T (≥0) or less, the transmission power of the relay station 20-1 is desired to satisfy Expression (2).

$$T \geq \frac{P_1}{PL_{R1R2}} \cdot G_2 \cdot \frac{1}{PL_{R2D2}} \quad \text{Expression (2)}$$

The $G_2$ in Expression (2) is expressed by Expression (3).

$$G_2 = \frac{P_2}{R_2 + \frac{P_1}{PL_{R1R2}}} \quad \text{Expression (3)}$$

Here, the $P_2$ is the transmission power of the relay station 20-2, and the $R_2$ is the reception power of a signal not including an interference signal from the relay station #1, in other words, a desired signal, in the relay station 20-2.

If Expression (3) is substituted into Expression (2), Expression (4) is obtained.

$$T \geq \frac{P_1}{PL_{R1R2}} \cdot \frac{P_2}{R_2 + \frac{P_1}{PL_{R1R2}}} \cdot \frac{1}{PL_{R2D2}} \quad \text{Expression (4)}$$

Since the $P_1$, the $PL_{R1R2}$, and the $R_2$ are non-negative values, it is possible to modify Expression (4) in such a way as Expression (5).

$$(PL_{R1R2}R_2 + P_1)T \geq \frac{P_1 P_2}{PL_{R2D2}} \quad \text{Expression (5)}$$

If Expression (5) is simplified with respect to the $P_1$, Expression (6) is obtained.

$$PL_{R1R2}R_2T \geq \left(\frac{P_2}{PL_{R2D2}} - T\right)P_1 \quad \text{Expression (6)}$$

Since the left side of Expression (6) is a non-negative value, when $(P_2/PL_{R2D2}) \leq T$ is satisfied, in other words, when reception power in the terminal 30-2 with respect to a signal the relay station 20-2 transmits is less than or equal to the threshold value T, Expression (6) is satisfied regardless of the transmission power of the relay station 20-1.

Therefore, the relay station 20-1 performs relay-transmission with transmission power less than or equal to the $P_1$ indicated in Expression (7), and hence it is possible to limit the reception power in the terminal 30-2 to the threshold value T or less. In other words, the $P_1$ indicated in Expression (7) corresponds to the upper limit value of the transmission power of the relay-transmission in the relay station 20-1.

$$P_1 = \begin{cases} \frac{PL_{R1R2}R_2T}{(P_2/PL_{R2D2} - T)} & \text{if } \frac{P_2}{PL_{R2D2}} > T \\ \infty & \text{if } \frac{P_2}{PL_{R2D2}} \leq T \end{cases} \quad \text{Expression (7)}$$

<Processing Sequence in Communication System>

Figure 6:
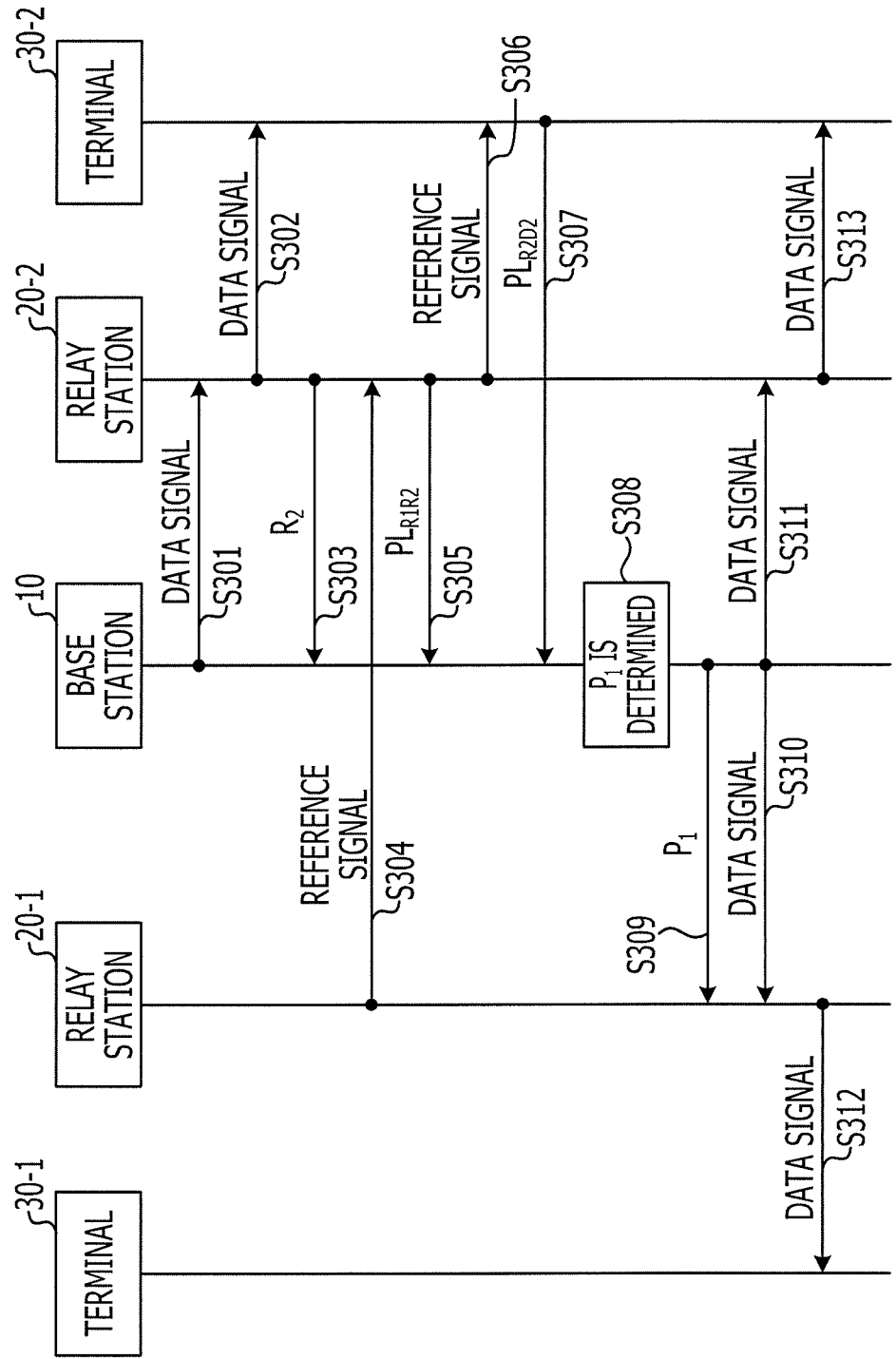
FIG. 6 is a diagram illustrating an example of a processing sequence in the communication system of the second embodiment.

FIG. 6 is a diagram illustrating an example of a processing sequence in the communication system of the second embodiment.

The base station 10 transmits a data signal addressed to the terminal 30-2 (S301), and the relay station 20-2 relay-transmits that data signal to the terminal 30-2 (S302).

The relay station 20-2 reports, to the base station 10, the reception power $R_2$ of the data signal received in the step S301 (S303).

The relay station 20-1 transmits a reference signal to the relay station 20-2 (S304).

Using the reference signal received in the step S304, the relay station 20-2 measures the path loss $PL_{R1R2}$, and reports the measured path loss $PL_{R1R2}$ to the base station 10 (S305).

The relay station 20-2 transmits a reference signal to the terminal 30-2 (S306).

Using the reference signal received in the step S306, the terminal 30-2 measures the path loss $PL_{R2D2}$, and reports the measured path loss $PL_{R2D2}$ to the base station 10 (S307).

The base station 10 determines the transmission power $P_1$ of the relay station 20-1 in the following way (S308).

In other words, in the transmission power management device 100 in the base station 10, the parameter acquisition unit 101 acquires individual parameters including the path losses $PL_{R1R2}$ and $PL_{R2D2}$, the reception power $R_2$, the threshold value T, and the transmission power $P_2$. On the basis of the individual acquired parameters, the upper limit value calculation unit 102 calculates the upper limit value of the transmission power of relay-transmission in the relay station 20-1 in accordance with Expression (7). Here, the threshold value T is a threshold value for the reception power in the terminal 30-2. In addition, the threshold value T and the transmission power $P_2$ are values already known to the base station 10.

In other words, in accordance with Expression (7), the upper limit value calculation unit 102 increases the upper limit value with an increase in the path loss $PL_{R1R2}$. In addition, the upper limit value calculation unit 102 increases the upper limit value with an increase in the path loss $PL_{R2D2}$, increases the upper limit value with an increase in the reception power $R_2$, and increases the upper limit value with an increase in the threshold value T. Furthermore, the upper limit value calculation unit 102 decreases the upper limit value with an increase in the transmission power $P_2$.

The transmission power management unit 103 determines the transmission power $P_1$ of the relay station 20-1 to be an electric power value less than or equal to the upper limit value calculated in the upper limit value calculation unit 102. For example, the transmission power management unit 103 determines the transmission power $P_1$ maximizing reception quality in the terminal 30-1, in a range less than or equal to the upper limit value. In addition, for example, the transmission power management unit 103 determines the transmission power $P_1$ according to a path loss between the relay station 20-1 and the terminal 30-1, in a range less than or equal to the upper limit value. Owing to this, it is possible to determine the transmission power $P_1$ to be an adequate electric power value, in a range less than or equal to the upper limit value calculated in the upper limit value calculation unit 102.

The base station 10 notifies the relay station 20-1 of the transmission power $P_1$ determined in the step S308 (S309).

The base station 10 transmits a data signal addressed to the terminal 30-1 (S310), and transmits a data signal addressed to the terminal 30-2 (S311).

The relay station 20-1 relay-transmits the data signal received in the step S310, to the terminal 30-1 with the transmission power $P_1$ (S312).

The relay station 20-2 relay-transmits, to the terminal 30-2, the data signal received in the step S311 (S313).

In addition, the fluctuation of the path loss $PL_{R1R2}$ is expected to be small in a case where the relay stations 20-1 and 20-2 are fixed stations. Therefore, in this case, it is decided that the path loss $PL_{R1R2}$, measured in advance and already known, is used, and the measurement and report of the path loss $PL_{R1R2}$ in FIG. 6 may also be omitted.

In addition, in the processing sequence illustrated in FIG. 6, the calculation of the upper limit value of the transmission power and the determination of the transmission power may also be periodically performed, and may also be performed when there is a change in the reception quality in the terminal 30-1, a change in the measured path loss, or the like.

In this way, according to the present embodiment, the upper limit value of the transmission power of the relay station 20-1 is calculated on the basis of the path loss between the relay station 20-1 and the relay station 20-2. Therefore, in a case where an interference signal due to a wraparound from the relay station 20-1 to the relay station 20-2 is received in the terminal 30-2, it is possible to determine the upper limit value of the transmission power of the relay station 20-1 with taking into consideration the degree of the influence of the interference signal on the deterioration of the reception quality of the terminal 30-2. Owing to this, in a case where a plurality of relay stations are densely placed, it is possible to suppress an interference due to a wraparound between relay stations, and it is possible to adequately control the transmission power of the relay station, in a range less than or equal to the upper limit value. As a result, it is possible to suppress an interference from a relay station to a terminal. Therefore, it is possible to avoid the deterioration of reception quality in the terminal, and it is possible to improve the throughput of the terminal.

[Third Embodiment]

In the third embodiment, an adjustment of the threshold value T for the reception power in the terminal 30-2 will be described.

<Specific Example of Adjustment of Threshold Value T>

Figure 7:
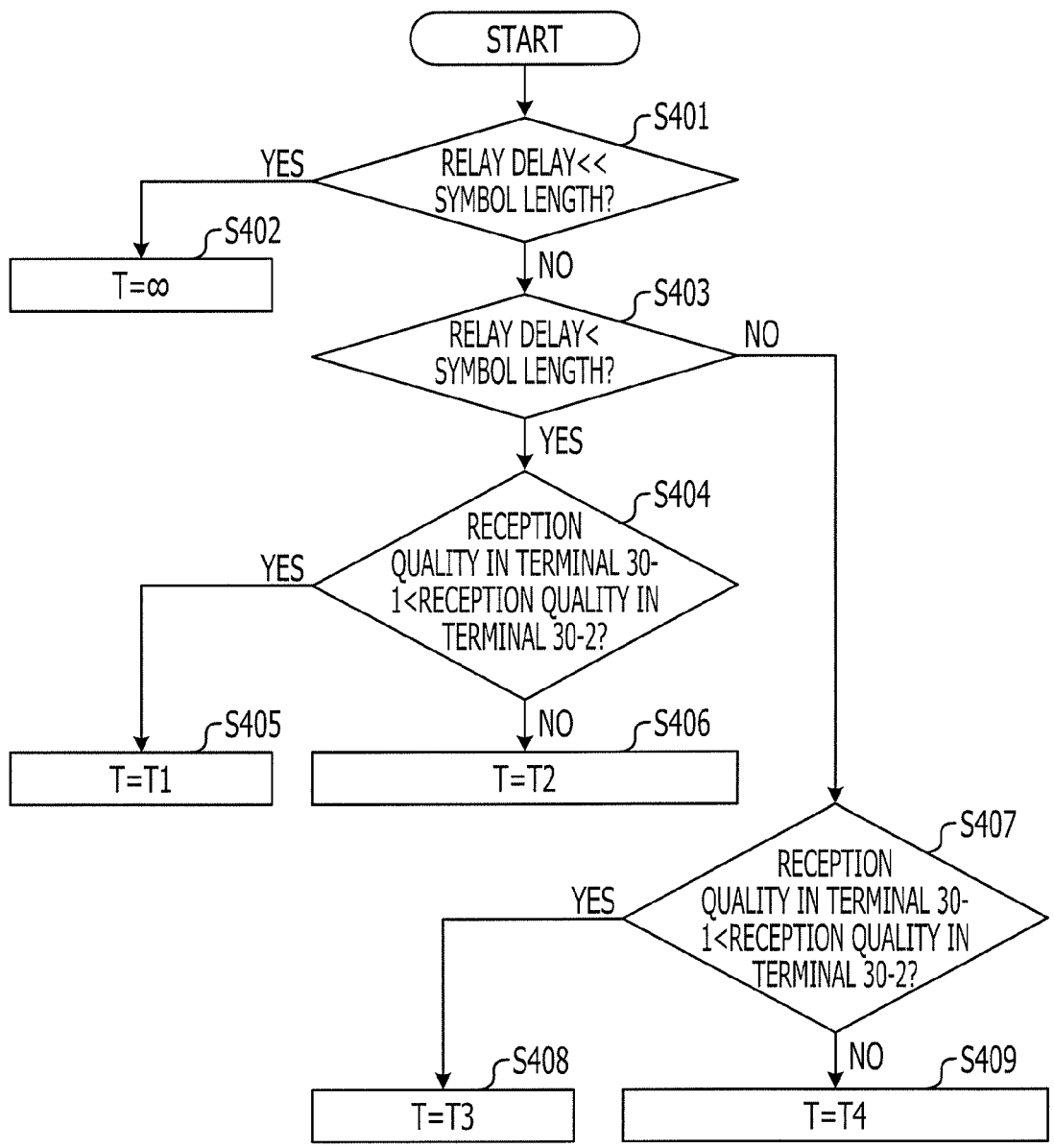
FIG. 7 is a flowchart used for explaining processing of an upper limit value calculation unit in a third embodiment.

FIG. 7 is a flowchart used for explaining the processing of an upper limit value calculation unit in the third embodiment.

In a case where a processing delay in relay-transmission in the relay station 20-1 (hereinafter, referred to as a "relay delay" in some cases) is negligible small with respect to the symbol length of a signal the relay station 20-1 relay-transmits, an interference in the terminal 30-2 becomes very small. Therefore, the transmission power of the relay station 20-1 may not be restricted using the threshold value T. Therefore, in a case where the relay delay is negligible small with respect to the symbol length (S401: Yes), the upper limit value calculation unit 102 sets the threshold value T to infinite ∞ (S402).

On the other hand, in a case where the relay delay is considerably large with respect to the symbol length (S401: No), the upper limit value calculation unit 102 adjusts the threshold value T to threshold values of four stages T1 to T4 (T1 >T2>T3>T4). In response to the magnitude of the relay delay with respect to the symbol length and a difference between reception quality in the terminal 30-1 and reception quality in the terminal 30-2, the upper limit value calculation unit 102 adjusts the threshold value T.

First, in a case where the relay delay is smaller than the symbol length (S403: Yes), the upper limit value calculation unit 102 narrows down the candidates of the threshold value T to the two high-order threshold values T1 and T2. In addition, in a case where the relay delay is greater than or equal to the symbol length (S403: No), the upper limit value calculation unit 102 narrows down the candidates of the threshold value T to the two low-order threshold values T3 and T4.

In other words, in a case where the relay delay is smaller than the symbol length, an interference in the terminal 30-2 becomes small. Therefore, the upper limit value calculation unit 102 selects, as the candidates of the threshold value T, the two high-order threshold values T1 and T2 from among the four-staged threshold values T1 to T4. On the other hand, in a case where the relay delay is greater than or equal to the symbol length, an interference in the terminal 30-2 becomes large. Therefore, the upper limit value calculation unit 102 selects, as the candidates of the threshold value T, the two low-order threshold values T3 and T4 from among the four-staged threshold values T1 to T4.

Next, in response to a difference between the reception quality in the terminal 30-1 and the reception quality in the terminal 30-2, the upper limit value calculation unit 102 determines, as the threshold value T, one of the two candidates of the threshold value.

In a case where the reception quality in the terminal 30-1 is poorer than the reception quality in the terminal 30-2 (S404: Yes or step S407: Yes), the reception quality in the terminal 30-1 is enhanced by permitting an interference to the terminal 30-2. Therefore, in this (S404: Yes or step S407: Yes), the upper limit value calculation unit 102 determines, as the threshold value T, a larger one of the two candidates of the threshold value. In other words, in the case of the step S404: Yes, T=T1 is satisfied (S405), and in the case of the step S407: Yes, T=T3 is satisfied (S408).

On the other hand, in a case where the reception quality in the terminal 30-1 is greater than or equal to than the reception quality in the terminal 30-2 (S404: No or step S407: No), the upper limit value calculation unit 102 determines, as the threshold value T, a smaller one of the two candidates of the threshold value, in order to suppress an interference to the terminal 30-2. In other words, in the case of the step S404: No, T=T2 is satisfied (S406), and in the case of the step S407: No, T=T4 is satisfied (S409).

In addition, the relay delay and the symbol length are values already known to the base station 10. In addition, the reception quality in the terminal 30-1 and the reception quality in the terminal 30-2 are reported from the terminal 30-1 and the terminal 30-2, respectively, to the base station 10, and acquired by the parameter acquisition unit 101.

In this way, in the present embodiment, the upper limit value calculation unit 102 increases the threshold value T for the reception power in the terminal 30-2 with a decrease in the processing delay in the relay-transmission in the relay station 20-1 as compared with the symbol length of a signal the relay station 20-1 relay-transmits. In addition, the upper limit value calculation unit 102 increases the threshold value T for the reception power in the terminal 30-2 with a decrease in the reception quality in the terminal 30-1 as compared with the reception quality in the terminal 30-2. Therefore, it is possible to adjust the threshold value T to an adequate value with taking into consideration the amount of an interference in a terminal.

[Fourth Embodiment]

<Example of Configuration of Communication System>

Figure 8:
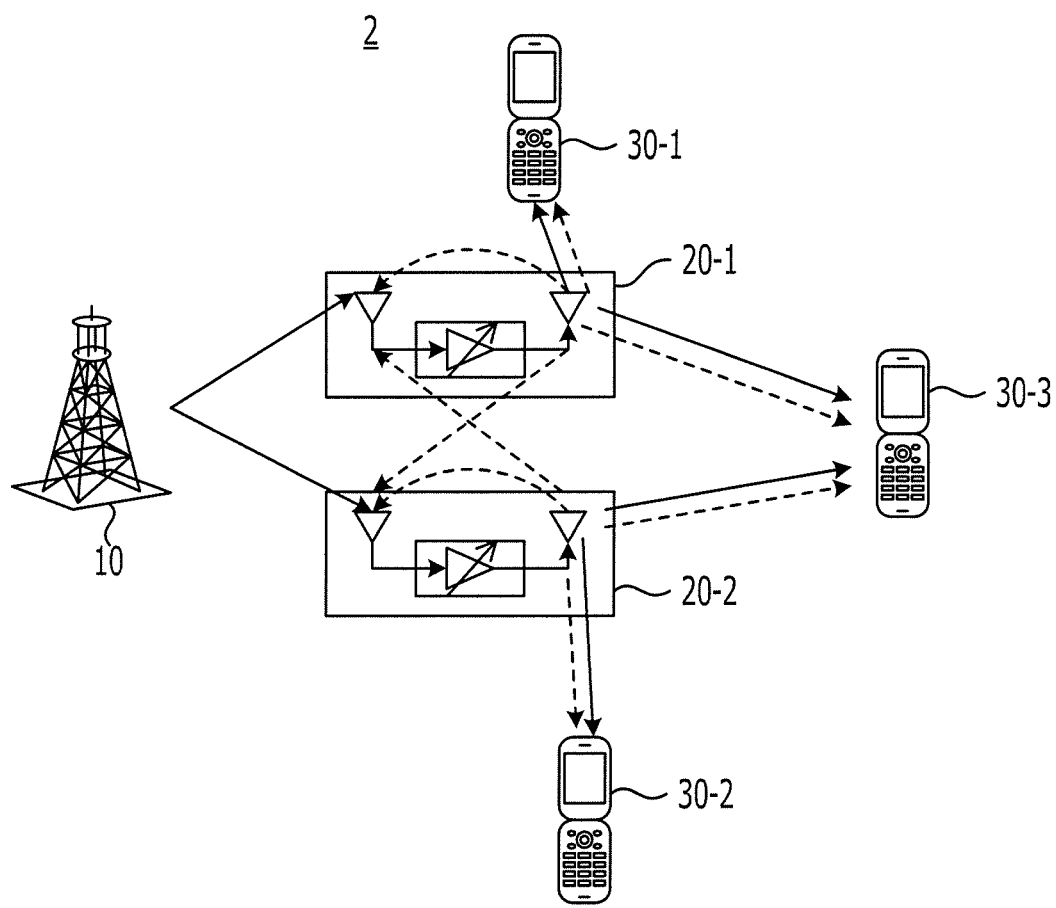
FIG. 8 is a diagram illustrating an example of a configuration of a communication system of a fourth embodiment.

FIG. 8 is a diagram illustrating an example of the configuration of a communication system of the fourth embodiment. In FIG. 8, a communication system 2 further includes a terminal 30-3, compared with the communication system 1 (FIG. 2). The terminal 30-3 receives both signals of a signal relay-transmitted by the relay station 20-1 and a signal relay-transmitted by the relay station 20-2. In FIG. 8, signals indicated by solid lines are desired signals, and signals indicated by dotted lines are interference signals due to wraparounds.

Under such a situation as illustrated in FIG. 8, on the basis of a path loss between relay stations, the transmission power management device 100 calculates the upper limit value of the transmission power of a relay station.

<Example of Calculation of Upper Limit Value of Transmission Power>

Hereinafter, in FIG. 8, a case will be assumed where a signal relay-transmitted from the relay station 20-1 is received by the relay station 20-2, and received by the terminal 30-2 and the terminal 30-3 after being relay-transmitted by the relay station 20-2 again. In this case, if the upper limit value of the transmission power of the relay station 20-1 is calculated in the following way, it is possible to make both the power of a reception signal in the terminal 30-2 and the power of a reception signal in the terminal 30-3 less than or equal to a threshold value.

In other words, if it is assumed that the relay station 20-1 performs relay-transmission with transmission power $P_1$, the power $Y_2$ of a signal received by the terminal 30-2 is expressed by Expression (8) and the power $Y_3$ of a signal received by the terminal 30-3 is expressed by Expression (9), in the above-mentioned case in FIG. 8.

$$Y_2 = \frac{P_1}{PL_{R1R2}} \cdot G_2 \cdot \frac{1}{PL_{R2D2}} \qquad \text{Expression (8)}$$

$$Y_3 = \frac{P_1}{PL_{R1R2}} \cdot G_2 \cdot \frac{1}{PL_{R2D3}} \qquad \text{Expression (9)}$$

In Expressions (8) and (9), the $P_1$ is the transmission power of the relay station 20-1, the $PL_{R1R2}$ is a path loss between the relay station 20-1 and the relay station 20-2, and the $PL_{R2D2}$ is a path loss between the relay station 20-2 and the terminal 30-2. In addition, the $PL_{R2D3}$ is a path loss between the relay station 20-2 and the terminal 30-3, and the $G_2$ is the gain of the relay station 20-2 with respect to a reception signal including an interference signal due to a wraparound from the relay station 20-1.

Therefore, in order to limit reception power in the terminal 30-2 to a threshold value $T_2$ ($\geq 0$) or less and to limit reception power in the terminal 30-3 to a threshold value $T_3$ ($\geq 0$) or less, the transmission power of the relay station 20-1 is desired to satisfy both Expression (10) and Expression (11).

$$T_2 \geq \frac{P_1}{PL_{R1R2}} \cdot G_2 \cdot \frac{1}{PL_{R2D2}} \qquad \text{Expression (10)}$$

$$T_3 \geq \frac{P_1}{PL_{R1R2}} \cdot G_2 \cdot \frac{1}{PL_{R2D3}} \qquad \text{Expression (11)}$$

The $G_2$ in Expression (10) and Expression (11) is expressed by Expression (12).

$$G_2 = \frac{P_2}{R_2 + \frac{1}{PL_{R1R2}}} \qquad \text{Expression (12)}$$

Here, the $P_2$ is the transmission power of the relay station 20-2, and the $R_2$ is the reception power of a signal not including an interference signal from the relay station #1, in other words, a desired signal, in the relay station 20-2.

If Expression (12) is substituted into each of Expression (10) and Expression (11), Expression (13) and Expression (14) are obtained.

$$T_2 \geq \frac{P_1}{PL_{R_1R_2}} \cdot \frac{P_2}{R_2 + \frac{P_1}{PL_{R_1R_2}}} \cdot \frac{1}{PL_{R_2D_2}} \quad \text{Expression (13)}$$

$$T_3 \geq \frac{P_1}{PL_{R_1R_2}} \cdot \frac{P_2}{R_2 + \frac{P_1}{PL_{R_1R_2}}} \cdot \frac{1}{PL_{R_2D_3}} \quad \text{Expression (14)}$$

In addition, by performing the same modification as Expressions (5) to (7) in the first embodiment, the upper limit value $P_1'$ of the $P_1$ satisfying Expression (13) and the upper limit value $P_1''$ of the $P_1$ satisfying Expression (14) are expressed as Expressions (15) and (16), respectively.

$$P_1' = \begin{cases} \frac{PL_{R_1R_2}R_2T_2}{(P_2/PL_{R_2D_2} - T_2)} & \text{if } \frac{P_2}{PL_{R_2D_2}} > T_2 \\ \infty & \text{if } \frac{P_2}{PL_{R_2D_2}} \leq T_2 \end{cases} \quad \text{Expression (15)}$$

$$P_1'' = \begin{cases} \frac{PL_{R_1R_2}R_2T_3}{(P_2/PL_{R_2D_3} - T_3)} & \text{if } \frac{P_2}{PL_{R_2D_3}} > T_3 \\ \infty & \text{if } \frac{P_2}{PL_{R_2D_3}} \leq T_3 \end{cases} \quad \text{Expression (16)}$$

Therefore, the relay station 20-1 performs relay-transmission with transmission power less than or equal to the $P_1$ indicated in Expression (17), and hence it is possible to limit the reception power in the terminal 30-2 to the threshold value $T_2$ or less and to limit the reception power in the terminal 30-3 to the threshold value $T_3$ or less. In other words, the $P_1$ indicated in Expression (17) corresponds to the final upper limit value of the transmission power of the relay-transmission in the relay station 20-1. Expression (17) expresses that a minimum upper limit value is adopted, as the final upper limit value, from among the $P_1'$ and the $P_1''$.

$$P_1 = \min\{P_1', P_1''\} \quad \text{Expression (17)}$$

<Processing Sequence in Communication System>

Figure 9:
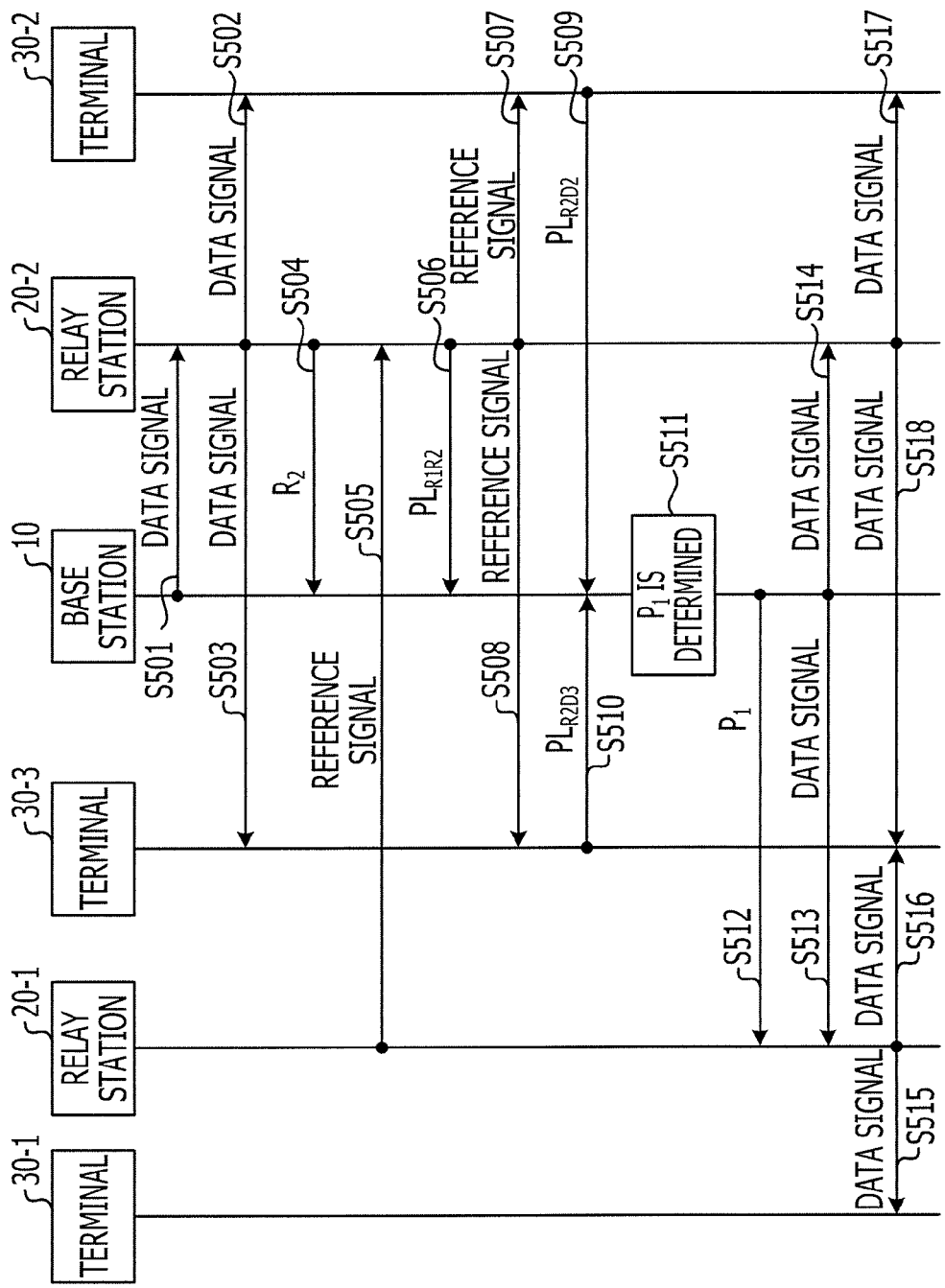
FIG. 9 is a diagram illustrating an example of a processing sequence in the communication system of the fourth embodiment.

FIG. 9 is a diagram illustrating an example of a processing sequence in the communication system of the fourth embodiment.

The base station 10 transmits a data signal addressed to the terminal 30-2 and a data signal addressed to the terminal 30-3 (S501).

The relay station 20-2 relay-transmits, to the terminal 30-2, the data signal addressed to the terminal 30-2 (S502), and relay-transmits, to the terminal 30-3, the data signal addressed to the terminal 30-3 (S503).

The relay station 20-2 reports, to the base station 10, the reception power $R_2$ of the data signal received in the step S501 (S504). The reception power $R_2$ to be reported may be any one of the reception power of the data signal addressed to the terminal 30-2 and the reception power of the data signal addressed to the terminal 30-3, and may also be the average value of the two.

The relay station 20-1 transmits a reference signal to the relay station 20-2 (S505).

Using the reference signal received in the step S505, the relay station 20-2 measures the path loss $PL_{R_1R_2}$, and reports the measured path loss $PL_{R_1R_2}$ to the base station 10 (S506).

The relay station 20-2 transmits a reference signal to the terminal 30-2 (S507), and transmits a reference signal to the terminal 30-3 (S508).

Using the reference signal received in the step S507, the terminal 30-2 measures the path loss $PL_{R_2D_2}$, and reports the measured path loss $PL_{R_2D_2}$ to the base station 10 (S509).

Using the reference signal received in the step S508, the terminal 30-3 measures the path loss $PL_{R_2D_3}$, and reports the measured path loss $PL_{R_2D_3}$ to the base station 10 (S510).

The base station 10 determines the transmission power $P_1$ of the relay station 20-1 in the following way (S511).

In other words, in the transmission power management device 100 in the base station 10, the parameter acquisition unit 101 acquires individual parameters including the path losses $PL_{R_1R_2}$, $PL_{R_2D_2}$, and $PL_{R_2D_3}$, the reception power $R_2$, the threshold value $T_2$, the threshold value $T_3$, and the transmission power $P_2$. On the basis of the individual acquired parameters, the upper limit value calculation unit 102 calculates the upper limit value of the transmission power of relay-transmission in the relay station 20-1 in accordance with Expressions (15) to (17). Here, the threshold value $T_2$ is a threshold value for the reception power in the terminal 30-2, and the threshold value $T_3$ is a threshold value for the reception power in the terminal 30-3. In addition, the threshold values $T_2$ and $T_3$ and the transmission power $P_2$ are values already known to the base station 10.

First, the upper limit value calculation unit 102 calculates the $P_1'$ in accordance with Expression (15), and calculates the $P_1''$ in accordance with Expression (16). In addition, the upper limit value calculation unit 102 adopts, as the final upper limit value, a minimum upper limit value from among the $P_1'$ and the $P_1''$, in accordance with Expression (17).

The transmission power management unit 103 determines the transmission power $P_1$ of the relay station 20-1 to be an electric power value less than or equal to the upper limit value calculated in the upper limit value calculation unit 102. For example, the transmission power management unit 103 determines the transmission power $P_1$ maximizing the average value of reception quality in the terminal 30-1 and reception quality in the terminal 30-3, in a range less than or equal to the upper limit value. In addition, the reception quality in the terminal 30-3 may also be maximized with taking into consideration an increase in an interference due to a signal relay-transmitted from the relay station 20-1 and further relay-transmitted in the relay station 20-2. Owing to this, it is possible to determine the transmission power $P_1$ to be an adequate electric power value, in a range less than or equal to the upper limit value calculated in the upper limit value calculation unit 102.

The base station 10 notifies the relay station 20-1 of the transmission power $P_1$ determined in the step S511 (S512).

The base station 10 transmits a data signal addressed to the terminal 30-1, a data signal addressed to the terminal 30-2, and a data signal addressed to the terminal 30-3 (steps S513 and S514).

The relay station 20-1 relay-transmits the data signal addressed to the terminal 30-1 and received in the step S513, to the terminal 30-1 with the transmission power $P_1$ (S515). In addition, the relay station 20-1 relay-transmits the data signal addressed to the terminal 30-3 and received in the step S513, to the terminal 30-3 with the transmission power $P_1$ (S516).

The relay station 20-2 relay-transmits the data signal addressed to the terminal 30-2 and received in the step S514, to the terminal 30-2 (S517). In addition, the relay station 20-2 relay-transmits the data signal addressed to the terminal 30-3 and received in the step S514, to the terminal 30-3 (S518).

In this way, according to the present embodiment, even in a case where the terminal 30-3 exists that receives both signals of a signal from the relay station 20-1 and a signal from the relay station 20-2, it is possible to avoid the deterioration of reception quality in a terminal, in the same way as the first embodiment.

[Fifth Embodiment]

<Example of Configuration of Communication System>

Figure 10:
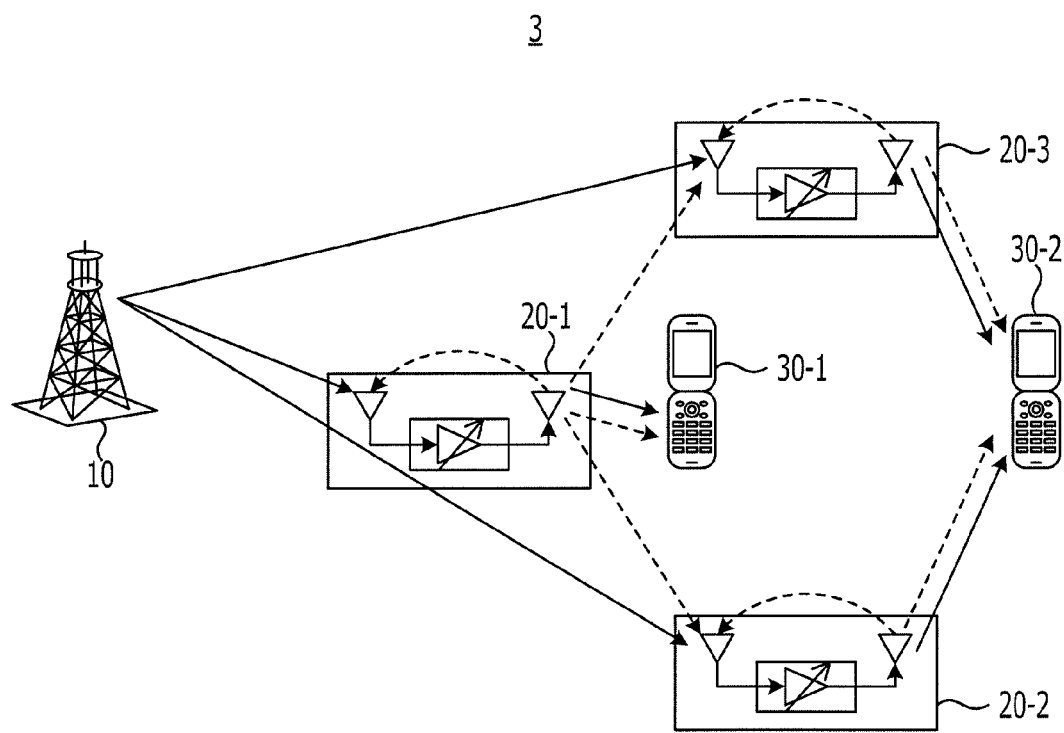
FIG. 10 is a diagram illustrating an example of a configuration of a communication system of a fifth embodiment.

FIG. 10 is a diagram illustrating an example of the configuration of a communication system of the fifth embodiment. In FIG. 10, a communication system 3 further includes a relay station 20-3, compared with the communication system 1 (FIG. 2). In addition, the terminal 30-2 receives both signals of a signal relay-transmitted by the relay station 20-2 and a signal relay-transmitted by the relay station 20-3. In addition, in FIG. 10, it is assumed that the relay station 20-2 and the relay station 20-3 are located well away from each other and there is no interference between the relay station 20-2 and the relay station 20-3. In addition, it is assumed that the direction of an interference between the relay station 20-1 and the relay station 20-2 is only one direction from the relay station 20-1 to the relay station 20-2, owing to the use of a directional antenna. In the same way, it is assumed that the direction of an interference between the relay station 20-1 and the relay station 20-3 is only one direction from the relay station 20-1 to the relay station 20-3. In FIG. 10, signals indicated by solid lines are desired signals, and signals indicated by dotted lines are interference signals due to wraparounds.

Under such a situation as illustrated in FIG. 10, on the basis of a path loss between relay stations, the transmission power management device 100 calculates the upper limit value of the transmission power of a relay station.

<Example of Calculation of Upper Limit Value of Transmission Power>

Hereinafter, in FIG. 10, a case will be assumed where signals relay-transmitted from the relay station 20-1 are received by both the relay station 20-2 and the relay station 20-3, and received by the terminal 30-2 after being relay-transmitted by both the relay station 20-2 and the relay station 20-3 again. In this case, if the upper limit value of the transmission power of the relay station 20-1 is calculated in the following way, it is possible to make the power of a reception signal in the terminal 30-2, in other words, the total value of the power of a reception signal from the relay station 20-2 and the power of a reception signal from the relay station 20-3, less than or equal to a threshold value.

In other words, if it is assumed that the relay station 20-1 performs relay-transmission with transmission power $P_1$, the power $Y_2$ of a signal received by the terminal 30-2 is expressed by Expression (18) in the above-mentioned case in FIG. 10.

$$Y_2 = \frac{P_1}{PL_{R1R2}} \cdot G_2 \cdot \frac{1}{PL_{R2D2}} + \frac{P_1}{PL_{R1R3}} \cdot G_3 \cdot \frac{1}{PL_{R3D2}} \quad \text{Expression (18)}$$

In Expression (18), the $P_1$ is the transmission power of the relay station 20-1, the $PL_{R1R2}$ is a path loss between the relay station 20-1 and the relay station 20-2, and the $PL_{R2D2}$ is a path loss between the relay station 20-2 and the terminal 30-2. In addition, the $PL_{R1R3}$ is a path loss between the relay station 20-1 and the relay station 20-3, and the $PL_{R3D2}$ is a path loss between the relay station 20-3 and the terminal 30-2. In addition, the $G_2$ is the gain of the relay station 20-2 with respect to a reception signal including an interference signal due to a wraparound from the relay station 20-1, and the $G_3$ is the gain of the relay station 20-3 with respect to a reception signal including an interference signal due to a wraparound from the relay station 20-1.

Therefore, in order to limit reception power in the terminal 30-2 to the threshold value T ($\geq 0$) or less, the transmission power of the relay station 20-1 is desired to satisfy Expression (19).

$$T \geq \frac{P_1}{PL_{R1R2}} \cdot G_2 \cdot \frac{1}{PL_{R2D2}} + \frac{P_1}{PL_{R1R3}} \cdot G_3 \cdot \frac{1}{PL_{R3D2}} \quad \text{Expression (19)}$$

The $G_2$ and the $G_3$ in Expression (19) are expressed by Expression (20) and Expression (21), respectively.

$$G_2 = \frac{P_2}{R_2 + \frac{P_1}{PL_{R1R2}}} \quad \text{Expression (20)}$$

$$G_3 = \frac{P_3}{R_3 + \frac{P_1}{PL_{R1R3}}} \quad \text{Expression (21)}$$

Here, the $P_2$ is the transmission power of the relay station 20-2, and the $P_3$ is the transmission power of the relay station 20-3. In addition, the $R_2$ is the transmission power of a signal not including an interference signal from the relay station #1, in other words, a desired signal, in the relay station 20-2, and the $R_3$ is the transmission power of a signal not including an interference signal from the relay station #1, in other words, a desired signal, in the relay station 20-3.

If Expression (20) and Expression (21) are substituted into Expression (19), Expression (22) is obtained.

$$T \geq \frac{P_1}{PL_{R1R2}} \cdot \frac{P_2}{R_2 + \frac{P_1}{PL_{R1R2}}} \cdot \frac{1}{PL_{R2D2}} + \quad \text{Expression (22)}$$

$$\frac{P_1}{PL_{R1R3}} \cdot \frac{P_3}{R_3 + \frac{P_1}{PL_{R1R3}}} \cdot \frac{1}{PL_{R3D2}}$$

Since the $P_1$, the $PL_{R1R2}$, the $R_2$, the $PL_{R1R3}$, and the $R_3$ are non-negative values, Expression (22) may be modified in such a way as Expression (23).

$$(PL_{R1R3}R_3 + P_1) \cdot (PL_{R1R2}R_2 + P_1)T \geq \quad \text{Expression (23)}$$

$$P_1(PL_{R1R3}R_3 + P_1) \cdot \frac{P_2}{PL_{R2D2}} +$$

$$P_1(PL_{R1R2}R_2 + P_1) \cdot \frac{P_3}{PL_{R3D2}}$$

If Expression (23) is simplified with respect to the $P_1$, Expression (24) is obtained.

$$\alpha P_1^2 + \beta P_1 + \gamma \leq 0 \quad \text{Expression (24)}$$

In this regard, however, the $\alpha$, the $\beta$, and the $\gamma$ in Expression (24) are expressed by Expression (25).

$$\alpha = \frac{P_2}{PL_{R2D2}} + \frac{P_3}{PL_{R3D2}} - T \quad \text{Expression (25)}$$

$$\beta = \left\{ \left(\frac{P_2}{PL_{R2D2}} - T\right)PL_{R1R3}R3 + \left(\frac{P_3}{PL_{R3D2}} - T\right)PL_{R1R2}R2 \right\}$$

$$\gamma = -PL_{R1R2}PL_{R1R3}R_2R_3T$$

Here, it is assumed that the left side of Expression (24) is a function $f(P_1)$ with the $P_1$ as a variable. In the case of $\alpha<0$, in other words, in a case where the total value of the reception power of a signal in the terminal 30-2, the signal being transmitted by the relay station 20-2, and the reception power of a signal in the terminal 30-2, the signal being transmitted by the relay station 20-3, is smaller than the threshold value T, the $f(P_1)$ is as follows. In other words, the $f(P_1)$ becomes a upward-convex quadratic function where $f(0) \leq 0$ and $f'(0) \leq 0$ are satisfied. Therefore, in the case of $\alpha<0$, Expression (24) is continuously satisfied regardless of the $P_1$. In addition, since, in the case of $\alpha=0$, the $f(P_1)$ also becomes a linear function where $f(0) \leq 0$ and $f'(0) \leq 0$ are satisfied, Expression (24) is continuously satisfied regardless of the $P_1$. On the other hand, since, in the case of $\alpha>0$, the $f(P_1)$ becomes a downward-convex quadratic function where $f(0) \leq 0$ is satisfied, $f(P_1)=0$ has two solutions, one of which is less than or equal to "0" and the other of which is greater than or equal to "0", or only one solution, $P_1=$.

Therefore, the relay station 20-1 performs relay-transmission with transmission power less than or equal to the $P_1$ indicated in Expression (26), and hence it is possible to limit the reception power in the terminal 30-2 to the threshold value T or less. In other words, the $P_1$ indicated in Expression (26) corresponds to the upper limit value of the transmission power of the relay-transmission in the relay station 20-1.

$$P_1 = \begin{cases} \frac{-\beta + \sqrt{\beta^2 - 4\alpha\gamma}}{2\alpha} & \text{if } \frac{P_2}{PL_{R2D2}} + \frac{P_3}{PL_{R3D2}} > T \\ \infty & \text{if } \frac{P_2}{PL_{R2D2}} + \frac{P_3}{PL_{R3D2}} \leq T \end{cases} \quad \text{Expression (26)}$$

<Processing Sequence in Communication System>

Figure 11:
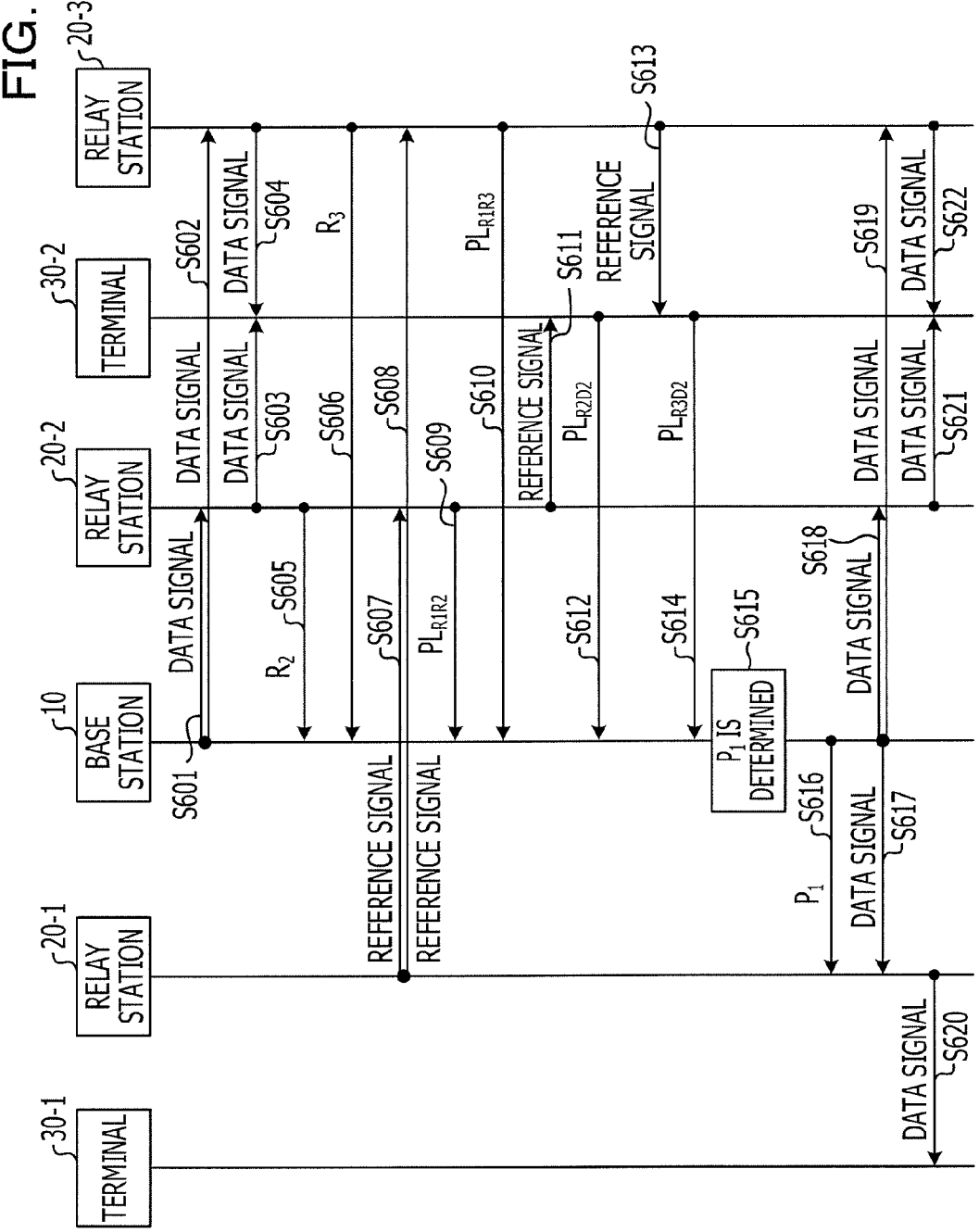
FIG. 11 is a diagram illustrating an example of a processing sequence in the communication system of the fifth embodiment.

FIG. 11 is a diagram illustrating an example of a processing sequence in the communication system of the fourth embodiment.

The base station 10 transmits data signals addressed to the terminal 30-2 (steps S601 and 602).

The relay station 20-2 and the relay station 20-3 relay-transmit, to the terminal 30-2, the respective data signals addressed to the terminal 30-2 (steps S603 and s604).

The relay station 20-2 reports, to the base station 10, the reception power $R_2$ of the data signal received in the step S601 (S605).

The relay station 20-3 reports, to the base station 10, the reception power $R_3$ of the data signal received in the step S602 (S606).

The relay station 20-1 transmits a reference signal to the relay station 20-2 (S607), and transmits a reference signal to the relay station 20-3 (S608).

Using the reference signal received in the step S607, the relay station 20-2 measures the path loss $PL_{R1R2}$, and reports the measured path loss $PL_{R1R2}$ to the base station 10 (S609).

Using the reference signal received in the step S608, the relay station 20-3 measures the path loss $PL_{R1R3}$, and reports the measured path loss $PL_{R1R3}$ to the base station 10 (S610).

The relay station 20-2 transmits a reference signal to the terminal 30-2 (S611).

Using the reference signal received in the step S611, the terminal 30-2 measures the path loss $PL_{R2D2}$, and reports the measured path loss $PL_{R2D2}$ to the base station 10 (S612).

The relay station 20-3 transmits a reference signal to the terminal 30-2 (S613).

Using the reference signal received in the step S613, the terminal 30-2 measures the path loss $PL_{R3D2}$, and reports the measured path loss $PL_{R3D2}$ to the base station 10 (S614).

The base station 10 determines the transmission power $P_1$ of the relay station 20-1 in the following way (S615).

In other words, in the transmission power management device 100 in the base station 10, the parameter acquisition unit 101 acquires individual parameters including the path losses $PL_{R1R2}$, $PL_{R1R3}$, $PL_{R2D2}$, and $PL_{R3D2}$, the reception power $R_2$, the threshold value T, and the transmission power $P_2$. On the basis of the individual acquired parameters, the upper limit value calculation unit 102 calculates the upper limit value of the transmission power of relay-transmission in the relay station 20-1 in accordance with Expression (26). Here, the threshold value T is a threshold value for the reception power in the terminal 30-2. In addition, the threshold value T and the transmission power $P_2$ are values already known to the base station 10.

The transmission power management unit 103 determines the transmission power $P_1$ of the relay station 20-1 to be an electric power value less than or equal to the upper limit value calculated in the upper limit value calculation unit 102.

The base station 10 notifies the relay station 20-1 of the transmission power $P_1$ determined in the step S615 (S616).

The base station 10 transmits a data signal addressed to the terminal 30-1 and a data signal addressed to the terminal 30-2 (steps S617, S618, and S619).

The relay station 20-1 relay-transmits the data signal addressed to the terminal 30-1 and received in the step S617, to the terminal 30-1 with the transmission power $P_1$ (S620).

The relay station 20-2 and the relay station 20-3 relay-transmit the respective data signals addressed to the terminal 30-2, to the terminal 30-2 (steps S621 and S622).

In this way, according to the present embodiment, even in a case where the three relay stations of the relay stations 20-1, 20-2, and 20-3 exist and the terminal 30-2 receives both signals of a signal from the relay station 20-2 and a signal from the relay station 20-3, it is possible to avoid the deterioration of reception quality in a terminal, in the same way as the first embodiment.

In addition, in FIG. 10, in a case where the relay station 20-2 and the relay station 20-3 are not located well away from each other and an interference occurs between the relay station 20-2 and the relay station 20-3, the transmission power of the relay station 20-1 may also be determined with taking into consideration first reception power and second reception power in the terminal 30-2. The first reception power means the power of a signal transmitted by the relay station 20-1, relay-transmitted by the relay station 20-3, further relay-transmitted by the relay station 20-2, and received by the terminal 30-2. The second reception power means the power of a signal transmitted by the relay station 20-1, relay-transmitted by the relay station 20-2, further relay-transmitted by the relay station 20-3, and received by the terminal 30-2.

[Sixth Embodiment]

In the present embodiment, a case will be described where a relay station includes the transmission power management device 100.

<Example of Configuration of Relay Station>

Figure 12:
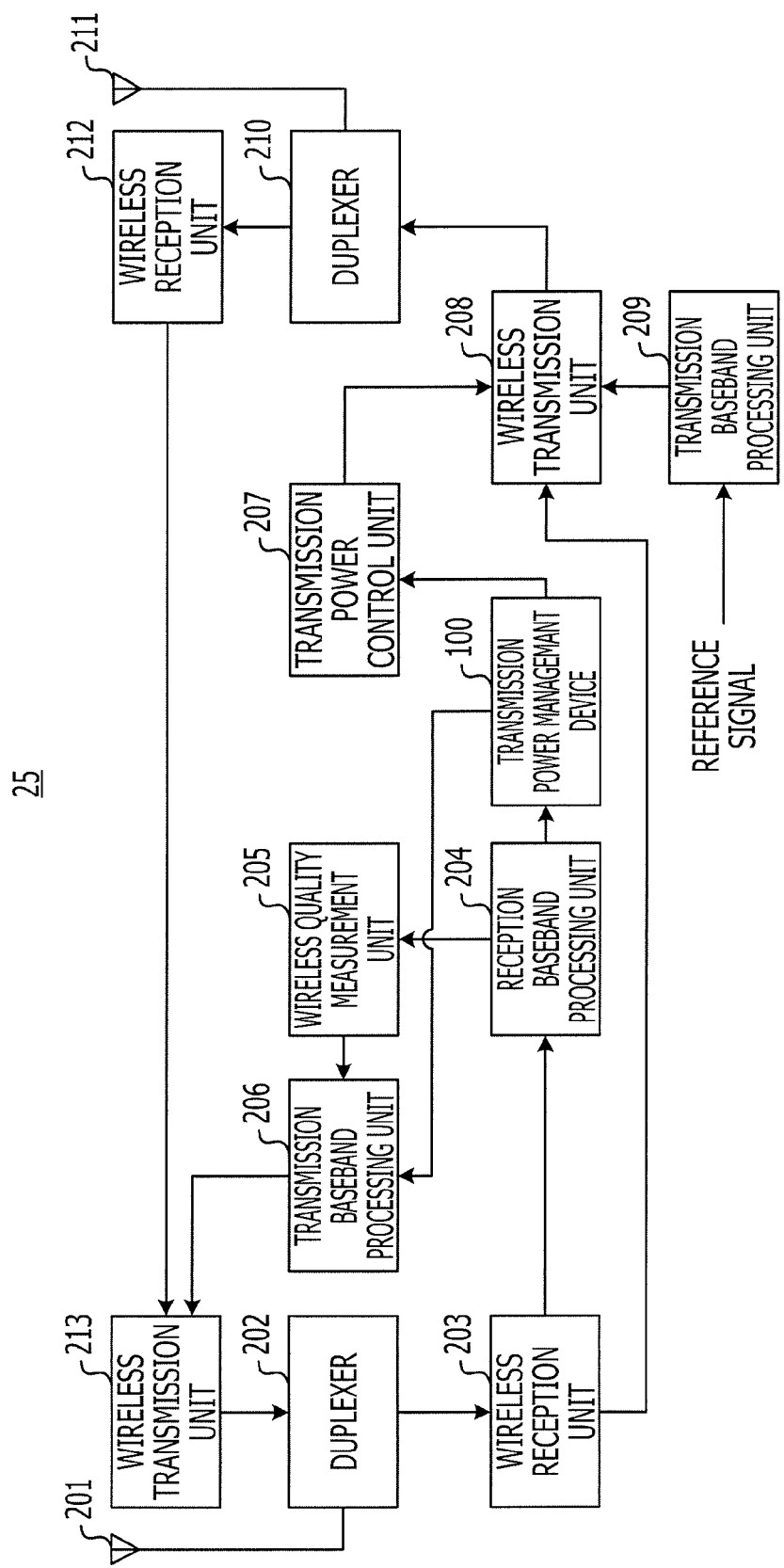
FIG. 12 is a functional block diagram illustrating an example of a relay station of a sixth embodiment.

FIG. 12 is a functional block diagram illustrating an example of the relay station of the sixth embodiment. A relay station 25 in FIG. 12 further includes the transmission power management device 100 with respect to the relay station 20 in FIG. 4.

The reception baseband processing unit 204 performs, on the baseband signal, reception baseband processing, in other words, demodulation and so forth to obtain and output reception data to the transmission power management device 100.

The transmission power management device 100 acquires a parameter included in the reception data, and calculates the upper limit value of the transmission power of the relay station 25 on the basis of the acquired parameter, in the same way as the first embodiment. In addition, in the same way as the first embodiment, the transmission power management device 100 determines the transmission power of the relay station 25 to be an electric power value less than or equal to the calculated upper limit value. In addition, the transmission power management device 100 outputs the relay station transmission power value data to the transmission baseband processing unit 206 and the transmission power control unit 207.

The transmission baseband processing unit 206 performs, on a measurement result input from the wireless quality measurement unit 205 and the relay station transmission power value data input from the transmission power management device 100, transmission baseband processing, in other words, modulation and so forth to obtain and output a baseband signal to the wireless transmission unit 213.

<Example of Configuration of Base Station>

In a case where a relay station includes the transmission power management device 100, the configuration of the base station 10 becomes a configuration where the transmission power management device 100 is omitted from the configuration illustrated in FIG. 3.

<Processing Sequence in Communication System>

Figure 13:
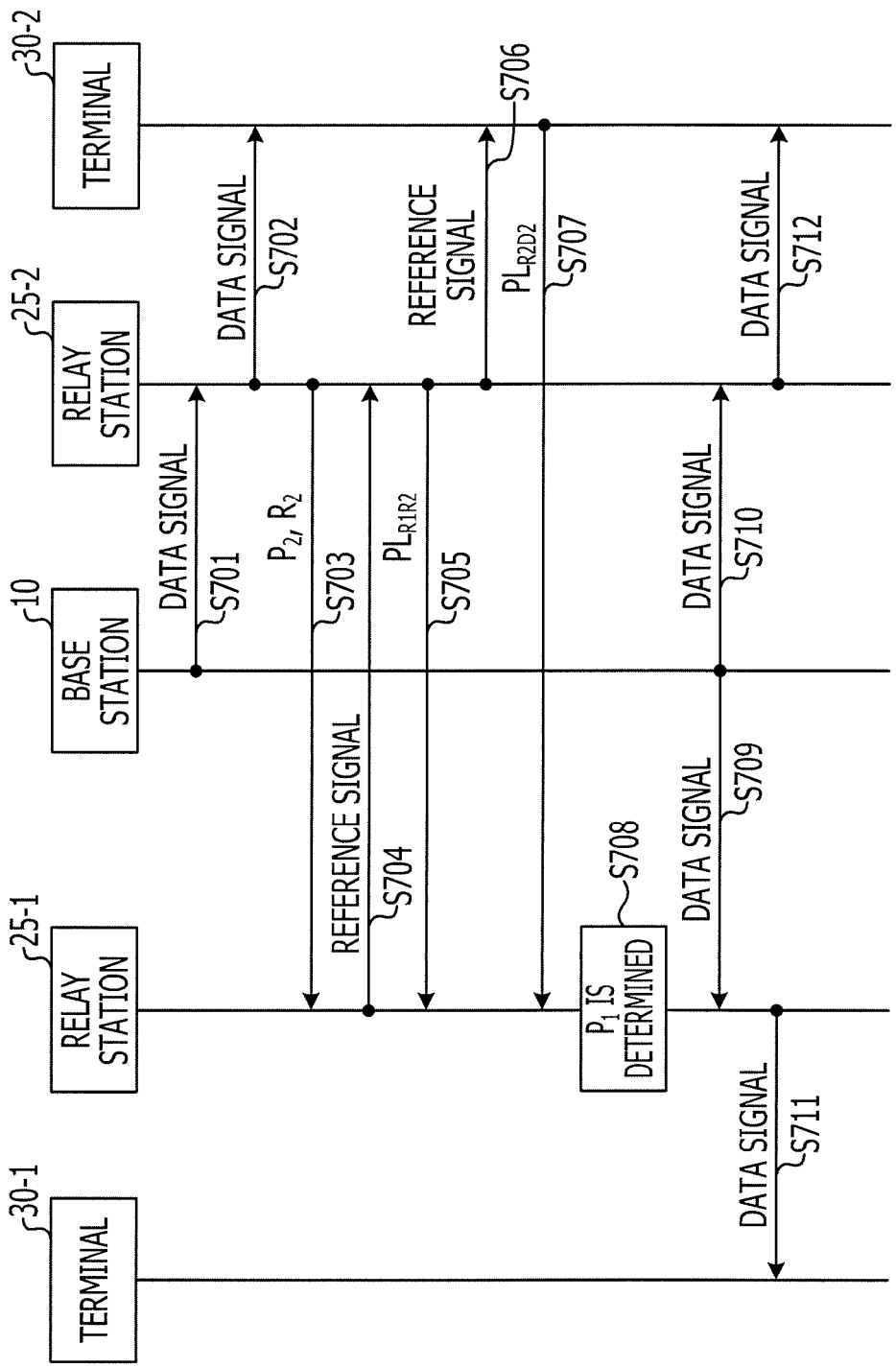
FIG. 13 is a diagram illustrating an example of a processing sequence in a communication system of the sixth embodiment.

FIG. 13 is a diagram illustrating an example of a processing sequence in the communication system of the sixth embodiment.

The base station 10 transmits a data signal addressed to the terminal 30-2 (S701), and a relay station 25-2 relay-transmits that data signal to the terminal 30-2 (S702).

The relay station 25-2 reports, to a relay station 25-1, the transmission power $P_2$ of the relay station 25-2 and the reception power $R_2$ of the data signal received in the step S701 (S703).

The relay station 25-1 transmits a reference signal to the relay station 25-2 (S704).

Using the reference signal received in the step S704, the relay station 25-2 measures the path loss $PL_{R1R2}$, and reports the measured path loss $PL_{R1R2}$ to the relay station 25-1 (S705).

The relay station 25-2 transmits a reference signal to the terminal 30-2 (S706).

Using the reference signal received in the step S706, the terminal 30-2 measures the path loss $PL_{R2D2}$, and reports the measured path loss $PL_{R2D2}$ to the relay station 25-1 (S707).

In the same way as the first embodiment, the relay station 25-1 determines the transmission power $P_1$ of the relay station 25-1 (S708).

The base station 10 transmits a data signal addressed to the terminal 30-1 (S709), and transmits a data signal addressed to the terminal 30-2 (S710).

The relay station 25-1 relay-transmits the data signal received in the step S709, to the terminal 30-1 with the transmission power $P_1$ (S711).

The relay station 25-2 relay-transmits, to the terminal 30-2, the data signal received in the step S710 (S712).

In addition, in the fourth and fifth embodiments, in the same way as the present embodiment, a relay station may also include the transmission power management device 100, and the relay station may also determine the transmission power of the self-station.

In this way, according to the present embodiment, in a case where the relay station determines the transmission power of the self-station, it is also possible to avoid the deterioration of reception quality in a terminal in the same way as the first embodiment.

[Another Embodiment]

Figure 14:
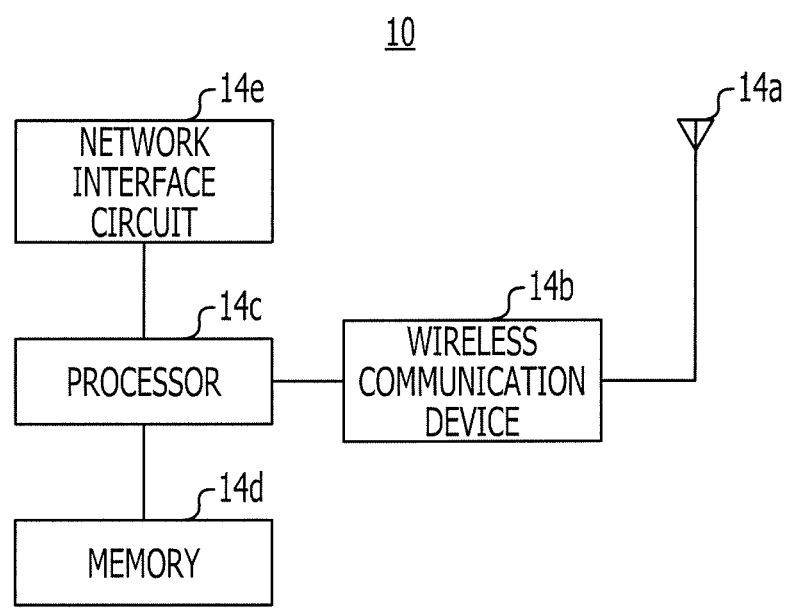
FIG. 14 is a diagram illustrating an example of a hardware configuration of a base station.

[1] It is possible to realize the above-mentioned base station 10 by adopting the following hardware configuration. FIG. 14 is a diagram illustrating an example of the hardware configuration of a base station. As illustrated in FIG. 14, the base station 10 includes, as the configuration elements of hardware, an antenna 14a, a wireless communication device 14b, a processor 14c, a memory 14d, and a network interface circuit 14e. As an example of the processor 14c, a central processing unit (CPU), a digital signal processor (DSP), a field programmable gate array (FPGA), or the like may be cited. In addition, the base station 10 may also include a large scale integrated circuit (LSI) including the processor 14c and a peripheral circuit. As an example of the memory 14d, a RAM such as a SDRAM, a ROM, a flash memory, or the like may be cited. The antenna 11 is realized by the antenna 14a. The duplexer 12, the wireless reception unit 13, the reception baseband processing unit 14, the transmission baseband processing unit 15, and the wireless transmission unit 16 are realized by the wireless communication device 14b. The transmission power management device 100 is realized by the processor 14c.

Figure 15:
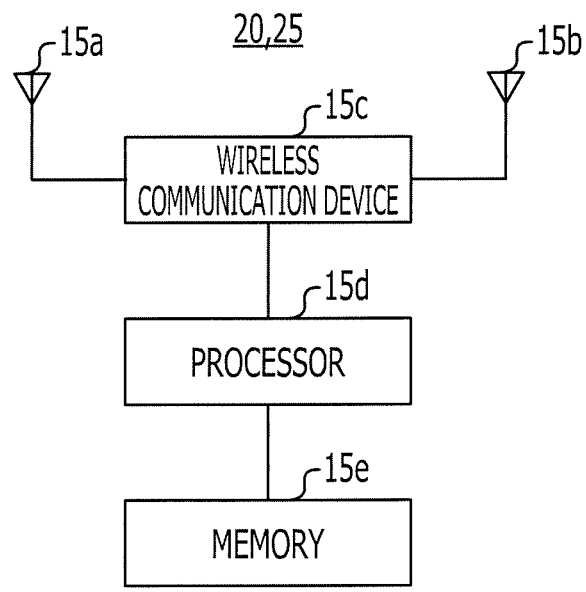
FIG. 15 is a diagram illustrating an example of a hardware configuration of a relay station.

[2] It is possible to realize the above-mentioned relay stations 20 and 25 using the following hardware configuration. FIG. 15 is a diagram illustrating an example of the hardware configuration of a relay station. As illustrated in FIG. 15, the relay station 20 or 25 includes, as the configuration elements of hardware, antennas 15a and 15b, a wireless communication device 15c, a processor 15d, and a memory 15e. As an example of the processor 15d, a CPU, a DSP, an FPGA, or the like may be cited. In addition, the relay station 20 or 25 may also include an LSI including the processor 15d and a peripheral circuit. As an example of the memory 15e, a RAM such as an SDRAM, a ROM, a flash memory, or the like may be cited. The antenna 201 is realized by the antenna 15a, and the antenna 211 is realized by the antenna 15b. The duplexers 202 and 210, the wireless reception units 203 and 212, the reception baseband processing unit 204, the transmission baseband processing units 206 and 209, and the wireless transmission units 208 and 213 are realized by the wireless communication device 15c. The wireless quality measurement unit 205, the transmission power control unit 207, and the transmission power management device 100 are realized by the processor 15d.

Figure 16:
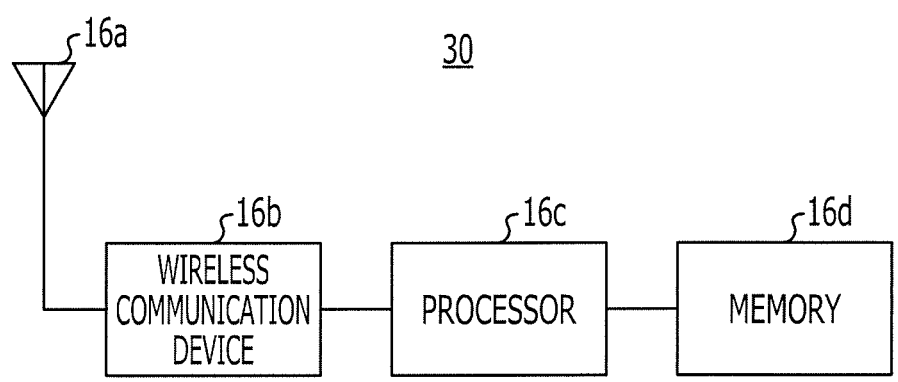
FIG. 16 is a diagram illustrating an example of a hardware configuration of a terminal.

[3] It is possible to realize the above-mentioned terminal 30 by adopting the following hardware configuration. FIG. 16 is a diagram illustrating an example of the hardware configuration of a terminal. As illustrated in FIG. 16, the terminal 30 includes, as the configuration elements of hardware, an antenna 16a, a wireless communication device 16b, a processor 16c, and a memory 16d. As an example of the processor 16c, a CPU, a DSP, an FPGA, or the like may be cited. In addition, the terminal 30 may also include an LSI including the processor 16c and a peripheral circuit. As an example of the memory 16d, a RAM such as an SDRAM, a ROM, a flash memory, or the like may be cited. The antenna 31 is realized by the antenna 16a. The duplexer 32, the wireless reception unit 33, the reception baseband processing unit 34, the transmission baseband processing unit 36, and the wireless transmission unit 37 are realized by the wireless communication device 16b. The wireless quality measurement unit 35 is realized by the processor 16c.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission power management device comprising:
a memory; and
a processor coupled to the memory and configured to:
acquire a first path loss between a first relay station and a second relay station, the first relay station being configured to relay a first signal transmitted from a first transmission device to a first reception device via the first relay station, the second relay station being configured to relay a second signal transmitted from a second transmission device to a second reception device via the second relay station, a period and a frequency of the first signal between the first relay station and the first reception device being substantially the same as a period and a frequency of the second signal between the second transmission device and the second relay station,
acquire a gain of the second relay station,
acquire a second path loss between the second relay station and the second reception device, and
set a first transmission power of a first signal transmitted from the first relay station to the first reception device, wherein:
a first reception power of the second reception device is determined based on the first transmission power, the first path loss, the gain and the second pass loss, and
the first transmission power is set so that the first reception power is under a threshold value.

2. The transmission power management device according to claim 1, wherein the processor is further configured to:
adjust an upper limit of the first transmission power based on the first path loss, and
adjust the first transmission power based on the upper limit.

3. The transmission power management device according to claim 2, wherein the processor is further configured to increase the upper limit as the first path loss increases.

4. The transmission power management device according to claim 1, wherein the processor is further configured to increase the upper limit as the second path loss increases.

5. The transmission power management device according to claim 2, wherein the processor is further configured to:
acquire a reception power of the second signal at the second reception device, and
adjust the upper limit further based on the reception power.

6. The transmission power management device according to claim 5, wherein the processor is further configured to increase the upper limit as the reception power increases.

7. The transmission power management device according to claim 2, wherein the processor is further configured to:
acquire a threshold of a reception power at the second reception device of the second signal, and
adjust the upper limit further based on the threshold.

8. The transmission power management device according to claim 7, wherein the processor is further configured to increase the upper limit as the threshold increases.

9. The transmission power management device according to claim 2, wherein the processor is further configured to:
acquire a second transmission power of the second signal by the second relay station, and
adjust the upper limit further based on the second transmission power.

10. The transmission power management device according to claim 9, wherein the processor is further configured to decrease the upper limit as the second transmission power increases.

11. The transmission power management device according to claim 2, wherein the processor is further configured to set the first transmission power to be less than or equal to the upper limit to maximize a reception quality at the first reception device.

12. The transmission power management device according to claim 7, wherein the processor is further configured to increase the threshold as a delay in relaying by the first station decreases.

13. The transmission power management device according to claim 7, wherein the processor is further configured to:
acquire a first reception quality at the first reception device of the first signal and a second reception quality at the second reception device of the second signal, and
increase the upper limit as the first reception quality is lower compared with the second reception quality.

14. The transmission power management device according to claim 1, wherein the first reception device is a first terminal, the second reception device is a second terminal, the first transmission device and the second transmission device is the same base station.

15. The transmission power management device according to claim 14, wherein the transmission power management device is included in the base station.

16. The transmission power management device according to claim 1, wherein the transmission power management device is included in the first relay station.

17. The transmission power management device according to claim 1, wherein the first transmission power is adjusted so that the interference from the first signal to the second signal at the second relay station is suppressed.

18. The transmission power management device according to claim 1, wherein
the first reception power is determined using the equation (1)

$$Y_2 = \frac{P_1}{PL_{R1R2}} \cdot G_2 \cdot \frac{1}{PL_{R2D2}},$$

wherein P1 represents the first transmission power, PLR1R2 represents the first path loss, G2 represents the gain, and PLR2D2 represents the second path loss.

19. A transmission power management method comprising:
   acquiring a first path loss between a first relay station and a second relay station, the first relay station being configured to relay a first signal transmitted from a first transmission device to a first reception device via the first relay station, the second relay station being configured to relay a second signal transmitted from a second transmission device to a second reception device via the second relay station, a period and a frequency of the first signal between the first relay station and the first reception device being substantially the same as a period and a frequency of the second signal between the second transmission device and the second relay station;
   acquiring a gain of the second relay station;
   acquiring a second path loss between the second relay station and the second reception device; and
   setting a first transmission power of a first signal transmitted from the first relay station to the first reception device, wherein:
   a first reception power of the second reception device is determined based on the first transmission power, the first path loss, the gain and the second pass loss, and
   and the first transmission power is set so that the first reception power is under a threshold value.

20. The transmission power management method according to claim 19, wherein adjusting the first transmission power of the first signal comprises:
   adjusting an upper limit of the first transmission power based on the first path loss, and
   adjusting the first transmission power based on the upper limit.

21. The transmission power management method according to claim 20, wherein adjusting the upper limit of the first transmission power of the first signal comprises increasing the upper limit as the first path loss increases.

* * * * *